US008125677B2

(12) United States Patent
Shestak et al.

(10) Patent No.: US 8,125,677 B2
(45) Date of Patent: Feb. 28, 2012

(54) METHODS AND SYSTEMS FOR IMPROVED PRINTING SYSTEM SHEETSIDE DISPATCH IN A CLUSTERED PRINTER CONTROLLER

(75) Inventors: Vladimir V. Shestak, Fort Collins, CO (US); Howard Jay Siegel, Bellvue, CO (US); James T. Smith, II, Boulder, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 991 days.

(21) Appl. No.: 12/058,675

(22) Filed: Mar. 29, 2008

(65) Prior Publication Data
US 2009/0244582 A1     Oct. 1, 2009

(51) Int. Cl.
G06F 15/00     (2006.01)
G06K 1/00      (2006.01)
G06K 15/00     (2006.01)
G06F 3/12      (2006.01)

(52) U.S. Cl. ......................... 358/1.18; 358/1.1
(58) Field of Classification Search .................. None
See application file for complete search history.

(56) References Cited

U.S. PATENT DOCUMENTS

| | | | |
|---|---|---|---|
| 5,596,416 A | 1/1997 | Barry et al. | |
| 5,833,375 A | 11/1998 | Gauthier et al. | |
| 6,088,120 A | 7/2000 | Shibsawa et al. | |
| 6,654,136 B2 | 11/2003 | Shimada | |
| 6,816,276 B2 | 11/2004 | Sugano | |
| 7,099,027 B1 | 8/2006 | Barry et al. | |
| 7,791,777 B2 * | 9/2010 | Barry et al. | 358/518 |
| 2001/0043357 A1 | 11/2001 | Owa et al. | |
| 2002/0051199 A1 | 5/2002 | Hatayama | |
| 2003/0142350 A1 | 7/2003 | Carroll | |
| 2004/0252344 A1 | 12/2004 | Foster et al. | |
| 2005/0068546 A1 | 3/2005 | Kuo et al. | |
| 2005/0275877 A1 | 12/2005 | Singh et al. | |
| 2008/0172302 A1 * | 7/2008 | Knodt | 705/26 |

FOREIGN PATENT DOCUMENTS

| | | |
|---|---|---|
| JP | 10-333844 | 12/1998 |
| JP | 11-353141 | 12/1999 |

OTHER PUBLICATIONS

Kumar, N. J., et al.; *Asynchronous Software Thread Integration for Efficient Software Implementations of Embedded Communication Protocol Controllers*; ACM—Proceedings of LCTES'04; Jun. 2004; pp. 37-46.
Kessler, C., et al.; *Optimal Integrated Code Generation for Clustered VLIW Architectures*; ACM—Proceedings of LCTES'02; Jun. 2002; pp. 102-111.
Pai, V., et al.; *Locality-Aware Request Distribution in Cluster-Based Network Servers*; ACM—Proceedings of ASPLOS VIII; Oct. 1998; pp. 205-216.

* cited by examiner

*Primary Examiner* — Douglas Tran
(74) *Attorney, Agent, or Firm* — Duft Bornsen & Fishman, LLP

(57) ABSTRACT

Methods, systems, and apparatus for improved dispatching of sheetsides in a high-speed (e.g., continuous form) printing environment using multiple, clustered processors in a print controller. Features and aspects hereof utilize a stochastic mathematical model of multiple processors (compute nodes) each adapted to RIP (rasterize) raw sheetside data provided to it. The model utilizes stochastic estimates of the probability of RIP execution time to select a preferred processor of the controller and dispatches the sheetside to the preferred compute node identified as providing best probability of meeting required deadlines for RIP completion time of a raw sheetside.

15 Claims, 18 Drawing Sheets

(Case 1)

(Case 2)

(Case 3)

(Case 4)

Earliest possible departure time

METHODS AND SYSTEMS FOR IMPROVED PRINTING SYSTEM SHEETSIDE DISPATCH IN A CLUSTERED PRINTER CONTROLLER

RELATED PATENTS

The invention relates commonly owned, co-pending U.S. patent application Ser. No. 11/469,833 by the same title and filed 1 Sep. 2006 which is hereby incorporated by reference and hereinafter referred to as the "sibling" patent.

BACKGROUND

1. Field of the Invention

The invention relates to the field of printing systems and in particular relates to improved systems and methods for sheetside dispatch in high speed printing systems using a clustered computing printer controller.

2. Discussion of Related Art

In high performance printing systems, which can be continuous form printing systems or cut sheet printing systems, the image marking engines apply RIPped (e.g., rasterized) images to continuous form paper moving through the marking engine at high rates of speed. Typically, pages to be imaged are combined into logical "sheetsides" that consist of one or more pages of equal length which when laid out for printing, span the width of the print web. Bitmap images of each sheetside to be printed are generated (RIPped) by a printer controller coupled to the high speed printing engine. It is vital in such high performance printing systems that the printer controller generates required bitmaps rapidly enough to maintain continuous throughput of paper through the image marking engine.

Two undesirable situations can occur when sheetsides cannot be ripped fast enough to feed the printer at a specified speed. First, the printer may slow its print speed as the quantity of ripped sheetsides ready to be printed decreases, thus causing a decrease in print throughput. This situation can happen in both continuous form and cut sheet printers. Secondly, in continuous form systems, the high speed marking engine may be forced to stop imprinting, stop the continuous form feed, and then restart at some later time when some predetermined quantity of ripped sheetsides is available for print. This type of event is known as a "backhitch". Not only does backhitching cause reduced print throughput, it can also result in undesirable print quality or tearing of the print web due to the abrupt stoppage of the paper. If the print web is torn, even more time is consumed in recovering from such an event.

In higher volume printing system environments such as high volume transaction or production printing (e.g., consumer billing statements, payroll processing, government printing facilities, etc.) such wasted time in a slower than planned print speed or a backhitch operation can represent a substantial cost to the printing environment. Downtime in such high volume printing environments is a serious problem for which printing system manufactures expend significant engineering effort to resolve. These problems are further exacerbated in two sided or duplex printing operations where the continuous form paper is fed through a first image marking engine, physically turned over, and fed in a continuous form fashion through a second image marking engine for printing the opposing side of the medium. Stopping such printing systems and performing a backhitch operation to accurately position the paper in multiple image marking engines further complicates the problems. Further, the processing workload for the printer controller in generating bitmap images for duplex printing is approximately twice that of simplex or single sided printing processing.

It is generally known to provide additional computational processing power within the printer controller to help assure that required bitmaps will be ready in time for the image marking engine to avoid the need for time consuming stop and backhitch operations. One recently proposed improvement teaches the use of a cluster computing architecture for a printer controller wherein multiple computers/processors ("compute nodes") are tightly coupled in a multiprocessor computing architecture. The aggregated computational processing power of the clustered computers provides sufficient processing capability in hopes of assuring that a next required bitmap image will always be available for the image marking engines.

Despite the presence of substantial computational power even in a clustered computing environment, there is a need to optimize the scheduling dispatch of sheetside bitmap image processing ("ripping") on the multiple compute nodes in the cluster in order to produce an efficient and cost-effective system. Well-known simplistic scheduling algorithms fail to adequately ensure that a next required bitmap will likely be available when required by the marking engines. Use of such simplistic algorithms also typically results in the need to specify more compute nodes than would be necessary under most circumstances, resulting in a more expensive system.

It is evident from the above discussion that a need exists for an improved method and associated systems for scheduling dispatch of sheetside bitmap image processing (e.g., RIPping) among the plurality of processors in a multi-computer clustered print controller environment to help reduce the possibility of image marking engine slowdown, or stoppage and backhitch.

SUMMARY

The invention solves the above and other related problems with methods and associated systems and apparatus for improved sheetside dispatching in a printer environment employing a clustered, multi-processor printer controller.

In one aspect, a method is provided for distributing sheetside processing in a cluster computing printer controller of a print system. The method includes receiving a print job comprising multiple sheetsides. For each sheetside, a probability distribution function (PDf) of a range of estimated RIP completion times is determined for each sheetside for each processor of multiple processors in the printer controller. The sheetside is then dispatched to a selected processor of the multiple processors based on the PDf such that said each sheetside has the highest probability of completing at a minimum RIP completion time.

The invention may include other exemplary embodiments described below.

DESCRIPTION OF THE DRAWINGS

The same reference number represents the same element on all drawings.

DETAILED DESCRIPTION OF THE DRAWINGS

FIGS. 1 through 28 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
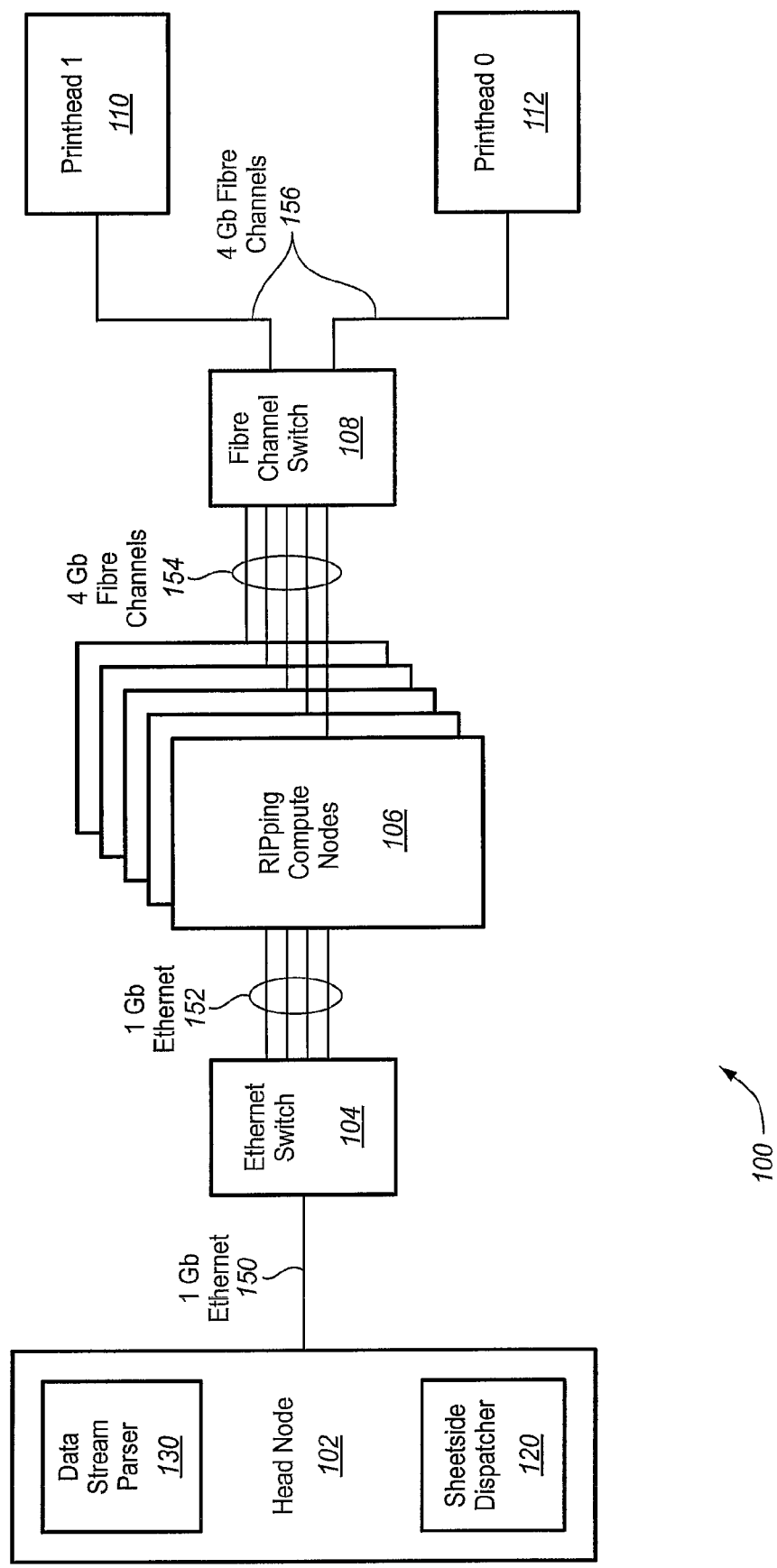
FIG. 1 is a block diagram of an exemplary system embodying features and aspects hereof to improve sheetside dispatch in a multi-processor print controller.

FIG. 1 is a block diagram of an exemplary system 100 configured, and adapted for operation in accordance with features and aspects hereof. System 100 may include three major components: head node 102, compute nodes 106, and printheads 110 and 112. Head node 102 may be any suitable computing device adapted to couple to host systems or print servers (not shown) and adapted to receive data representing raw pages. This data is raw in the sense that it is encoded in a form other than a RIPped bitmap image of the desired sheetside. Rather, the raw data may be encoded in any of several well known page description languages such as PCL, Postscript, IPDS, etc. The components may be interconnected as shown in FIG. 1 such that the head node 102 is coupled through a switched fabric 104 to the plurality of compute nodes 106. The switched fabric may be, for example, Ethernet, Fibre Channel, etc. Each of compute nodes 106 may be a suitable computing device adapted to receive a raw sheetside from the head node and adapted to RIP (rasterize) the received sheetside to generate a corresponding RIPped sheetside (i.e., a rasterized bitmap rendition) corresponding to the sheetside described by the corresponding received raw sheetside data. Multiple such compute nodes 106 form a cluster.

As is known in the art, each compute node 106 as well as the head node 102 may be a general purpose or specialized computing device (including one or more processors). Thus, as used herein, the head node and each of the compute nodes may also be referred to as "computers", "processors", or "nodes". Often clusters of such nodes are configured and packaged as a single cabinet or box with each computing node referred to as a "blade". The collection of blades may be referred to as a "blade server" or "blade center". In such blade clusters, the medium coupling the various nodes may be commercialized standard busses (such as various PCI bus configurations) and/or customized bus structures as well as the exemplary fabrics noted above. Therefore a "blade" as used herein is also synonymous processor, computer, or node. The specific packaging and integration of the computers as one or more printed circuits, in a single enclosure or in multiple enclosures, and the particular means of coupling the various computers are well known matters of design choice.

Head Node

Attached host systems and/or print server devices (not shown in FIG. 1) may stream print job input data to the head node 102 of system 100 through a high speed communication channel (not shown) such as a 10 Gb Ethernet channel. For purposes of model computations exemplified below, such a high speed channel may be presumed to provide approximately 50% payload efficiency in its data transmission. Files arriving at the head node 102 contain raw page descriptions—such as Postscript, Adobe Portable Document Format, HP PCL, or IBM IPDS/AFP. For purposes of this description it is also assumed that page descriptions arrive in the ascending order of page numbers and are stored at the head node in available space of a head node input queue. Head node 102 may include a main functional element, datastream parser 130, which will parse the data of the input stream to form logical sheetside description files in order to provide discrete units of work to be RIPped. These logical sheetside description files may then be placed in yet another queue (e.g., for example a 4 GB buffer of RAM memory on the head node 102 may serve as such an input queue ("HNIQ")).

Head node 102 may include a main functional element, sheetside dispatcher 120 ("SSD"). SSD 120 retrieves sheetside description files and distributes or dispatches them across the compute nodes 106 by executing a certain mapping (i.e., resource management) heuristic discussed further herein below. In the sibling patent it was assumed that the estimated time required to produce a bitmap out of each sheetside description file (e.g., the RIP execution time or sheetside execution time) is a known discrete value for each of the sheetsides. However, the RIP time for a sheetside is hard to know with any precision. Rather, it is essentially a random variable that may only be accurately represented as a probability function of historically gathered data points relating to processing of that sheetside or similar classes of sheetsides. In this application, it is assumed that sheetsides in a given print job have been previously classified—i.e., sheetsides with similar rasterization complexities are put in the same class. It also is assumed that the number of classes, C, is known in advance by SSD 120. If a single random variable $X_i$ is used to represent the RIP execution time for class $i=1, \ldots, C$, then all possible actual RIP execution times (outcomes) of sheetsides belonging to that class form the sample space for $X_i$. Random variable $X_i$ is fully described when its probability density function (PDf) $fX_i(x)$ is determined. Further discussion herein below presents the quantitative basis used in the model to approximate $fX_i(x)$ for a given sheetside class with its discrete form. This basis is used to describe the RIP execution time for a sheetside class.

For modeling of the operation of system 100, it may be assumed that all compute nodes provide the same computational power, i.e., it is a homogeneous system of compute nodes. Features and aspects hereof for modeling the system 100 can readily be extended for the case where compute nodes can differ in performance, i.e., a heterogeneous system of compute nodes. In the heterogeneous case, there must be a mechanism for estimating the RIP time (sheetside execution time) of each sheetside on each compute node based on the type of each compute node. In addition to the sheetside execution time modeled by features and aspects hereof, other factors are considered in determining the actual completion time (sheetside completion time). A number of these other factors are noted herein below followed by a more detailed discussion of the stochastic features and aspects hereof for determining the sheetside completion time and thus the heuristics for distributing or mapping sheetsides to processors for optimal processing of the document.

Compute Nodes

Compute nodes 106 can be represented as a homogeneous collection of "B" independent compute nodes (e.g., "compute nodes", "processors", "computers", "nodes", etc.). The main relevant use of each compute node is to convert sheetside description files received from the head node 102 to corresponding bitmap files. Sheetside description files assigned to a compute node 106 dynamically arrive from the head node 102 to an input buffer/queue associated with each compute node. Each compute node 106 also has an output buffer/queue for storing completed, RIPped sheetsides. The compute node retrieves the sheetside files in its input queue in FIFO order for rasterization as soon as the compute node's output buffer has enough space to accommodate a complete generated bitmap. The total amount of buffer memory in each compute node is divided between the compute node's input and output buffers at system initialization time. The sizes of the bitmaps generated are known to be constant as a function of the bitmap resolution and size to be generated.

For the exemplary model and dispatch heuristics discussed herein below, the sheetside execution times defined by the PDf may or may not include compression processing of the bitmap depending on the source of the empirical data used to formulate the PDf. Further, the model and heuristics may be easily extended to account for variability in the size of generated bitmaps due to compression as stored in the output buffer/queue of each compute node. Such extensions are readily apparent to those of ordinary skill in the art.

Before a sheetside can be RIPped there must be space in the compute node output buffer sufficient to accommodate the uncompressed bitmap. Using bitmap compression, the size of the compressed bitmap is unknown until compression completes. Therefore, even utilizing compression, where the final compressed bitmap size may be less than the uncompressed bitmap, sufficient space must be reserved to accommodate the entire uncompressed bitmap. After the sheetside is RIPped, the actual compressed bitmap size will be known and can be used to determine what space remains available in the given compute node's output buffer.

Two control event messages may be originated at the compute node 106 for use in the model and heuristics discussed further herein below. An event message may be generated indicating when rasterization for a given sheetside is completed. One control event message is sent to the head node 102 carrying the sheetside number of the bitmap, its size, and its creation time. Another control message is forwarded to the corresponding printhead (110 or 112) indicating that the bitmap for the given sheetside number as now available on the compute node 106.

Printheads

Two identical printheads may be employed in a monochrome, duplex print capable embodiment of features and aspects hereof. A first printhead 110 is responsible for printing odd numbered sheetsides, while printhead 112 is responsible for printing even numbered sheetsides. Sheetsides are printed in order according to sheetside numbers. For purposes of the model and heuristics discussed herein below, printing speed is presumed constant and known. A typical printhead interface card has sufficient memory to store some fixed number of RIPped bitmaps or a fraction thereof. In the discussion below, an exemplary buffer size associated with the printheads may be presumed to be equal to two (2) uncompressed bitmaps. Persons skilled in the art will readily see how the data transfer method could be modified to handle a buffer which is less than 2 bitmaps in size.

Bitmaps are requested sequentially by the printheads 110 and 112 from the compute nodes 106 based on information about which bitmaps are in each compute node's output buffer. This information is acquired by the printheads upon receiving control messages from the compute nodes as noted above. When the printhead interface card's buffer memory is full, the next bitmap will be requested from the compute node at the time when the printhead completes printing one of the stored bitmaps.

In this exemplary two printhead monochrome system, printhead 0 (112) will print the even numbered sheetsides, and printhead 1 (110) will print the odd numbered sheetsides. The sheetsides will be printed on both sides of a sheet of paper of the continuous form paper medium. For simplicity of this discussion, it may be presumed that the print job begins with sheetside 1 printed on printhead 1, and printhead 0 must print sheetside 2 on the other side of the sheet, at some time later. The time difference between when sheetside 1 and sheetside 2 are printed depends on the physical distance between the two printheads, the speed at which the paper moves, etc. This time difference defines the order in which sheetsides are needed by the printheads, e.g., the time when sheetside 15 is needed by printhead 1 may be the same time that sheetside 8 is needed by printhead 0 (in this example an offset of 15−8=7 will be a constant offset between odd and even numbered sheetsides that are needed simultaneously). Without loss of generality, this discussion will assume an offset of 0. This assumption will simplify the description in this document. The incorporation of offsets greater than 0 requires simple modifications to account for a time difference between the two printheads for when a sheetside image must be completed by processing of a compute node.

Communication Links

As shown in exemplary system 100 of FIG. 1 there may be a 1 Gb Ethernet network (150 and 152 of FIG. 1) connecting the head node 102 and the compute nodes 106 with one crossbar Ethernet switch 104 between them. This network serves transfer sheetside description files from the head node 102 to any of the compute nodes 106. Assuming a typical 50% payload efficiency of the Ethernet, 500 Mb/sec would be a typical effective communication bandwidth to model the channel from the head node 102 to the compute nodes 106 for this exemplary system 100.

There may be a 4 Gb Fibre Channel network (154 and 156 of FIG. 1) connecting the compute nodes 106 and the printheads 110 and 112 with one crossbar switch 108 between them. This network is used to transfer bitmaps from any compute node 106 to any printhead 110 or 112.

Those of ordinary skill in the art will readily recognize that these exemplary communication channel types and speeds may vary in accordance with the performance requirements and even the particular data of a particular application. Thus, system 100 of FIG. 1 is merely intended as exemplary of one typical system in which features and aspects hereof represented by SSD 120 may be advantageously employed.

Sheetside Dispatch Data Flow and Method

Figure 2:
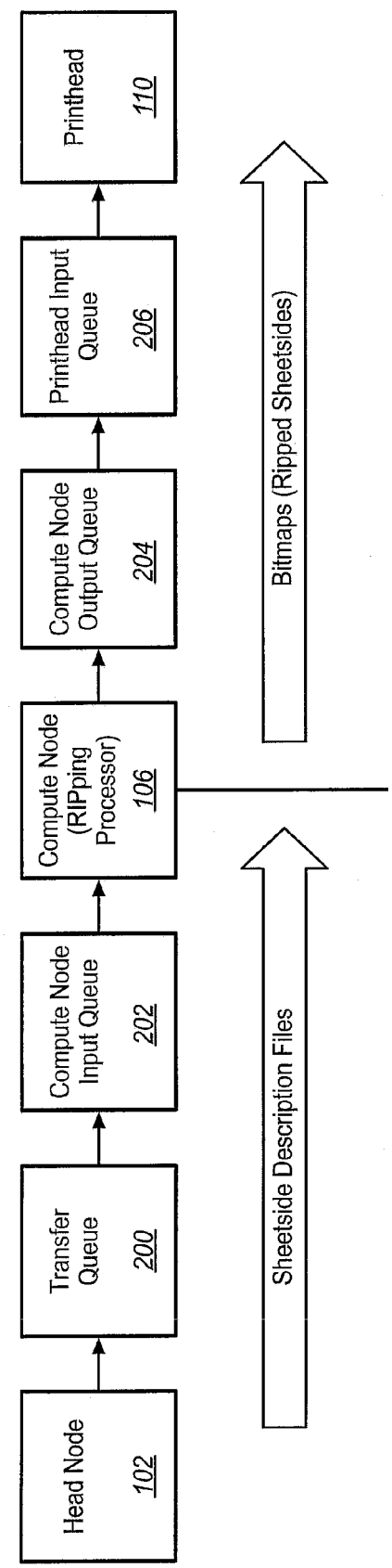
FIG. 2 is a block diagram showing exemplary buffer and queue structures used in communication among the exemplary components of FIG. 1 in accordance with features and aspects hereof.

The mathematical model applied by the system of FIG. 1 and discussed in detail herein below presumes an exemplary queuing structure in the communications between the various components. Some constraints and parameters of the model depend on aspects of these queues and the communication time and latencies associated therewith. FIG. 2 shows the data flow in the system of FIG. 1 with the head node 102, a single compute node 106, and a single printhead 110 with the various exemplary queues associated with each. In particular, transfer queue 200 receives sheetside descriptions from head node 102 to be forwarded to the input queue 202 of a selected compute node processor 106. Compute node input queue 202 may be constrained only by its total storage capacity and thus may store any number of sheetside descriptions forwarded to it constrained only by its maximum storage capacity. By contrast, transfer queue 200 may be limited to a predetermined number of sheetsides regardless of its storage capacity. More specifically, in an exemplary preferred embodiment, transfer queue 200 has capacity to store only two sheetside descriptions. This constraint helps assure that the sheetside dispatching algorithms, in accordance with features and aspects hereof, defer selecting a particular compute node processor for a particular sheetside as late as possible. This imposed delay allows the dynamic nature of the system to change such that a better compute node may be selected by the heuristics.

Compute node 106 eventually processes and dequeues each sheetside description from its input queue 202 (in FIFO order to retain proper sequencing of sheetsides). Each sheetside description is dequeued by the compute node 106 from its input queue 202 and processed to generate a corresponding bitmap or RIPped sheetside. The resulting RIPped sheetside is stored in the output queue 204 associated with this selected compute node 106. As above with respect to input queue 202, the output queue 204 of compute node 106 is constrained only by its total storage capacity. Where bitmaps are uncompressed and hence all equal fixed size the number of bitmaps that may be stored in output queue 204 is also fixed. Where bitmap compression is employed, the maximum number of bitmaps in the output queue 204 may vary.

Eventually, printhead 110 will determine that another bitmap may be received in its input queue 206 and requests the next expected RIPped sheetside from the appropriate output queue for the compute node 106 that generated the next sheetside (in sheetside number order). As noted above, the buffer space associated with printhead 110 is typically sufficient to store two sheets such that the first sheet is in process scanning on the printhead while a second RIPped sheetside is loaded into the buffer memory. Such "double-buffering" is well known to those of ordinary skill in the art.

Figure 3:
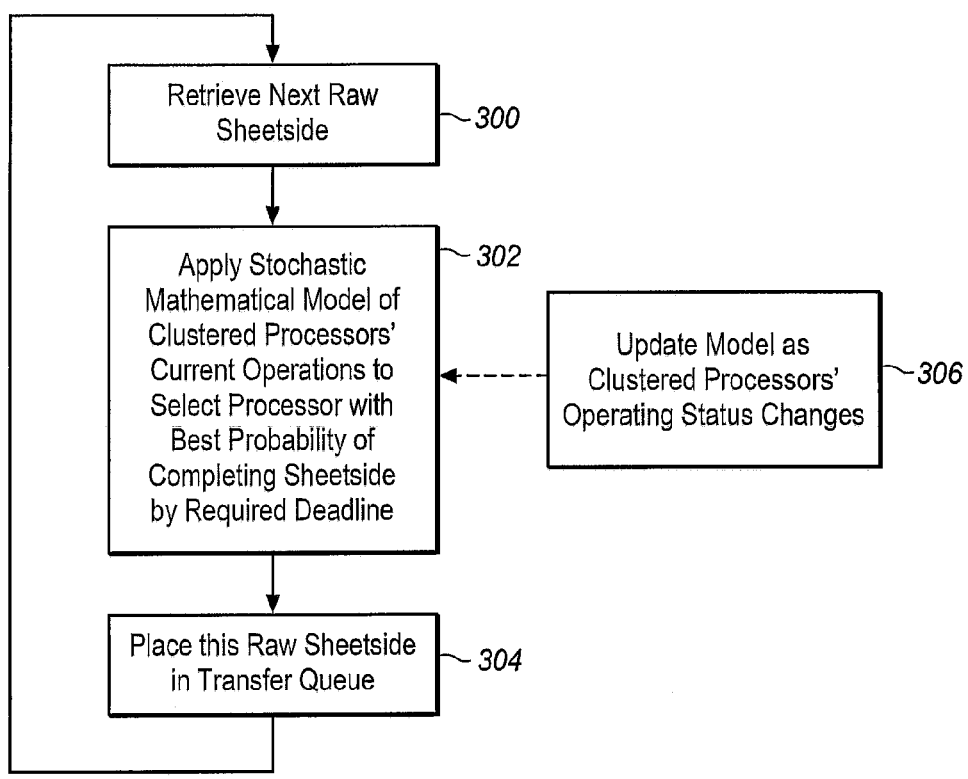
FIG. 3 is a flowchart describing an exemplary method in accordance with features and aspects hereof to distribute sheetside processing in a clustered processing environment according to a stochastic mathematical model.

FIG. 3 is a flowchart broadly describing operations of the system in accordance with features and aspects hereof to utilize the stochastic mathematical model discussed in detail below to dispatch raw sheetsides for processing. The Head Node 102 applies the probability based computations discussed below to select the best processor of the plurality of compute nodes 106 to process a next sheetside. The "best" processor is generally determined as that processor which provides the highest probability of completing processing of the sheetside by a required deadline for the sheetside (i.e., the lowest probability of missing the deadline). The method of FIG. 3 is preferably operable within the head node or any designated control processor of the system. In general such a control processor will be that which is coupled to attached host systems and/or servers and coupled to the plurality of compute nodes/processors. The control node is adapted to receive parsed print data (raw sheetsides) and possesses the computational power to select a preferred/best processor from among the compute nodes/processors. The control processor/head node then dispatches each raw sheetside to its selected processor.

Step 300 retrieves the next raw sheetside from a buffer or queue associated with the head node. The head node input queue is used for storing all received raw sheetsides in sheetside order as received from the datastream parser. In general, all received raw sheetside data may be stored in a queue structure such that each raw sheetside comprises an identifiable group or file identified by the sheetside number. As noted above, for simplicity of this description, it may be presumed that the system operates on a single print job having multiple raw sheetsides numbered 1 through N. Simple extensions readily understood by those of ordinary skill in the art may adapt the method of FIG. 3 to process multiple jobs each having a distinct number of sheetsides associated therewith each commencing with a sheetside numbered 1 relative to that job.

Step 302 applies the mathematical model to determine the probability distribution for each processor to process this next raw sheetside. As discussed further herein below, the probability distribution for each processor is defined as a probability function that defines that processor's capability for processing the next sheetside—or more often for processing a class of sheetside images of which the current sheetside is a member. Such classes may be defined in accordance with the needs of a particular application. Further, the probability function is presumed to be known and may be determined, for example, by gathering empirical or historical data for processing of this sheetside or for a class of comparably complex sheetsides.

As further detailed herein below, a number of factors may be involved in the determination of the probability function for each processor based on present operating status of each processor and other factors. Having so determined the probability distribution function for each of the processors, step 302 selects the "best" processor based on the probability distributions function computations for each processor. Step 304 then dispatches this raw sheetside to the selected (best) processor to be RIPped and eventually forwarded to the printhead in proper order. Processing then loops back to step 300 to continue processing other raw sheetsides received at the head node.

Substantially concurrently with the operation of steps 300 through 304, step 306 continuously updates the parameters used in the stochastic mathematical model describing current operating status and capacity of the plurality of processors/compute nodes. This present operating status changes as each raw sheetside is completely RIPped by its assigned processor and as new raw sheetside files are received. In like manner, as each completed, RIPped sheetside is transferred to a corresponding printhead, other operating parameters and status of the plurality of processors may be updated by step 306. The dashed line coupling step 306 to step 302 represents the retrieval of current operating status information by operation of step 302 when computing the mathematical model to select a processor for the current raw sheetside.

Another method in accordance with features and aspects providing additional details is provided herein below following a thorough discussion of the stochastic model.

Mathematical Model

In general the dispatch mapping method in accordance with features and aspects hereof help assure that each bitmap (RIPped sheetside) required by each printhead will be available when needed by the printhead. In achieving this goal, features and aspects hereof account for at least the following issues in modeling operation of the system:

1. As noted above, the sheetside execution time (RIP time) to generate a bitmap is known to the SSD for each sheetside as defined by a PDf determined in accordance with empirical data for similar classes of sheetside images.
2. Sheetsides must print in order according to sheetside number.
3. The compute nodes' input and output buffers are constrained in size. Hence, there is a limit on the number of sheetsides that can be buffered at any point in time.
4. An arrival process of the new sheetside description files proceeds in parallel with printing. This implies that the mapping has to be produced dynamically as conditions of the system may change dynamically.

In accordance with features and aspects hereof, assignments to compute nodes are made by the SSD for individual sheetsides sequentially in order of sheetside numbers. In one aspect, the SSD distributes sheetsides across the compute nodes based on the principle that a sheetside is mapped to the compute node that maximizes the probability of completing the RIPping of a sheetside in time for its transfer to the required printhead. In other words, each sheetside is assigned to its Minimum RIP Completion Time (MRCT) compute node. A mathematical model for determining the completion time of a sheetside is presented herein below in terms of stochastic models of the processing. The mathematical model forms the basis for the heuristic mapping methods and structures operable in accordance with features and aspects hereof.

The mathematical model discussed further herein below presumes the following:

1. RIP completion time estimates for sheetsides may deviate from actual RIP completion times.
2. When a sheetside has been assigned to a compute node, after it leaves the head node, it cannot be reassigned to another compute node. More precisely, sheetsides cannot be reassigned after they are placed in the transfer queue of the head node.
3. The time required to execute the mapping heuristic may be neglected.
4. The system is considered to be in a steady state of operation implying that the time that the first bitmap was needed by any printhead is known. The "startup" state is not considered herein.

The time required for the print engine to print a bitmap is constant.

6. The uncompressed bitmap size is fixed for all sheetsides.
7. There is exactly one print job consisting of σ sheetsides, where the actual sheetside numbers of the print job are numbered 1 to σ. Those of ordinary skill in the art will readily recognize extensions to the model to accommodate multiple consecutive jobs.
8. During rasterization (ripping) of a sheetside on a compute node, the description file of the sheetside will remain in the input buffer of the compute node (for purposes of computing queue utilization), and space sufficient for the entire resultant bitmap will be reserved in the output buffer of the compute node (for purposes of computing queue utilization).

Mathematical Model—Sheetside Deadline

As in the sibling patent, the essential purpose of the stochastic MRCT features and aspects hereof is to assure that a sheetside will be ready to print by the time deadline at which the sheetside needs to be ready to print using the proper printhead to avoid stoppage of the printing engine. Thus, a sheetside deadline is determined as previously disclosed in the sibling patent application.

As regards the start times of the printheads, let $t_0$ be the start time of printhead 0 (e.g., printhead 112 of FIG. 1) and $t_1$ be the start time of printhead 1 (e.g., printhead 110 of FIGS. 1 and 2). Note that $t_0$ and $t_1$ may be absolute wall-clock times. From the printhead start times, each printhead requires a new bitmap every $t_{print}$ seconds, where $t_{print}$ is the time to print a bitmap on the printhead. Let printhead 1 start printing first and let x be the number of sheetsides (all of which will be odd numbered) printed by printhead 1 before starting print engine 0. Then, $t_0$ can be given in terms of $t_1$ as $t_0 = t_1 + t_{print} \times x$. Given the $i^{th}$ "actual sheetside number" of the print job denoted $SS_i$, sheetsides numbered from 1, the $SS_i$ bitmap has to be available for printing at time $$t_1 + t_{print} \times \left(\frac{SS_i - 1}{2}\right)$$

if i is odd, and at time $$t_0 + t_{print} \times \left(\frac{SS_i}{2}\right)$$

if i is even. Let $t_{tran}^{bitmap}$ be the bitmap transfer time from the compute nodes to a printhead. Then, $SS_i$'s deadline, $t_d[SS_i]$, indicates the latest wall-clock time for a compute node to produce $SS_i$'s bitmap:

$$t_d[SS_i] = \begin{cases} t_1 + t_{print} \times \left(\frac{SS_i - 1}{2}\right) - t_{tran}^{bitmap} & \text{if } SS_i \text{ is odd} \\ t_0 + t_{print} \times \left(\frac{SS_i}{2}\right) - t_{tran}^{bitmap} & \text{if } SS_i \text{ is even} \end{cases} \quad (1)$$

Mathematical Model—Approximation of RIP Completion Time Distributions

The primary objective of the stochastic MRCT heuristic is to minimize the probability that a sheetside will miss its deadline, causing the print engine to stop. Given the PDf of the RIP completion time for a sheetside on a given processor, the probability that the sheetside will miss its deadline on that processor is given by the area under the PDf curve corresponding to a RIP completion time greater than the sheetside deadline, i.e., the area under the portion of the curve that lies to the right of the sheetside's deadline.

Figure 4:
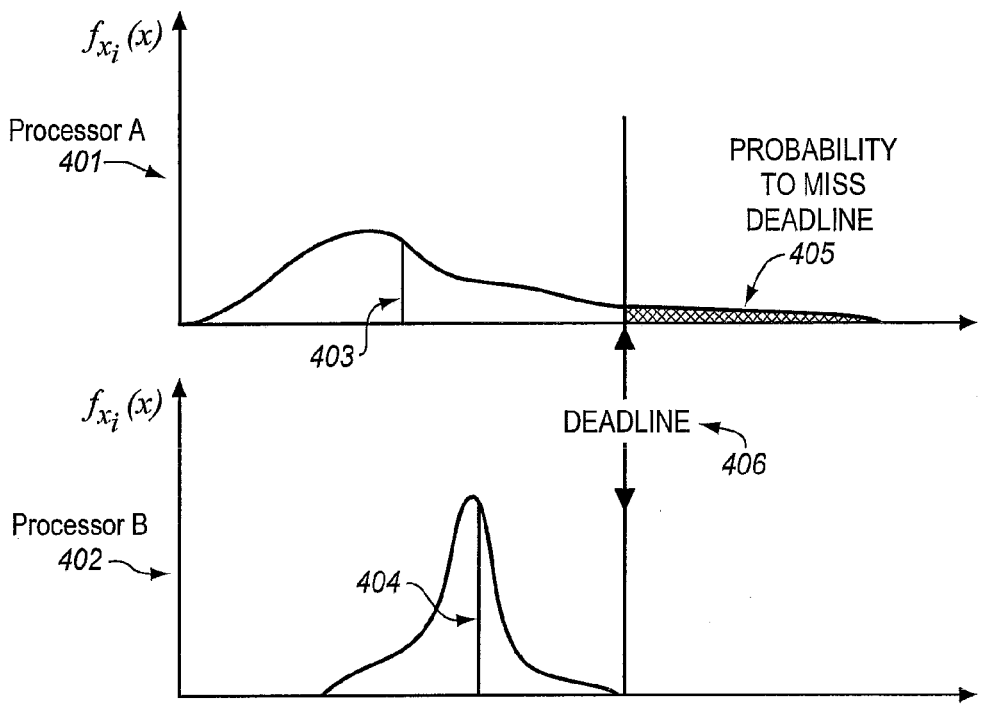
FIGS. 4, 5, and 6 depict exemplary graphs of probability distribution functions for processing of exemplary sheetside images.

For example, in FIG. 4, exemplary PDf functions are shown for the distribution of possible RIP execution times (RET) of an exemplary raw sheetside. The probability function (f) is shown on the Y-axis of the graph for each of two exemplary processors (processor A 401 and processor B 402) and possible RIP execution times are shown on the X-axis. The determined deadline time for this exemplary sheetside is shown by the vertical line 406 intersecting each graph. In other words, the exemplary sheetside must be RIPped within that amount of execution time to be ready for the print engine at the proper time to avoid print engine stoppage. Processor A 401 shows a non-zero probability of missing the deadline as indicated by the shaded portion 405. Thus the exemplary sheetside should be assigned to processor B 402 that has a lower probability to miss the deadline (i.e., a zero probability in this exemplary case).

Note that processor A 401 has a smaller mean RIP completion time indicated by vertical line 403 as compared to the mean of processor B 402 (indicated by line 404). but since processor A 401 has a non-zero probability of missing the deadline (405) and processor B 402 has a zero probability of missing the deadline, heuristically, processor B 402 should be chosen to process the sheetside.

Figure 5:
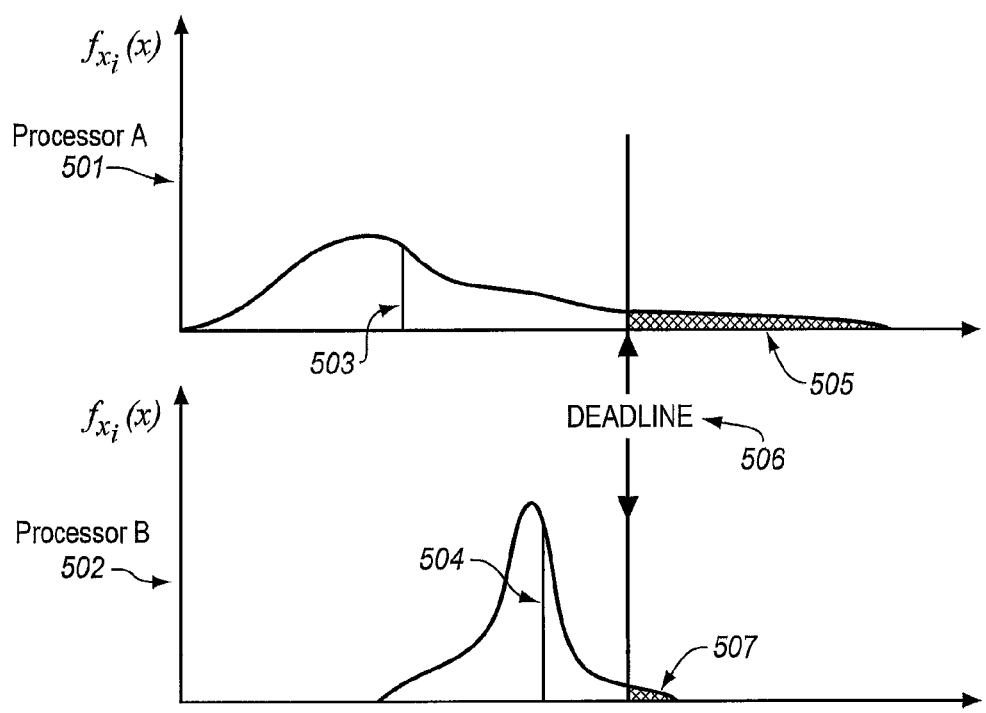

If no processor has a zero probability of missing the sheetside's deadline then according to the primary objective of the stochastic MRCT heuristic the processor that minimizes the probability of missing the considered sheetside's deadline will be chosen. In FIG. 5, processor B 502 will be chosen over processor A 501 because it has a lower probability (507 versus 505) of missing the considered sheetside's deadline (506). As in FIG. 4, even though the mean completion time 503 of the sheetside on processor A 501 is smaller than the mean completion time 504 on processor B 502, processor B 502 has the lower probability of failure 507 (as compared to 505).

Figure 6:
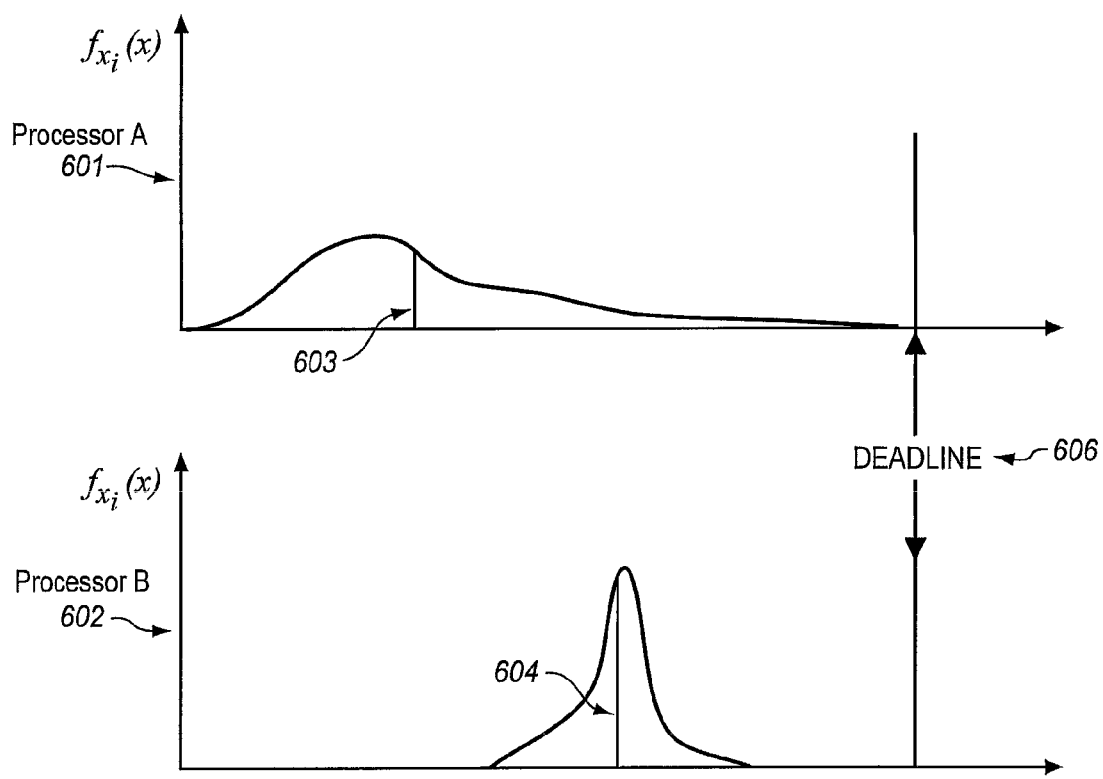

In FIG. 6 where both processors 601 and 602 have zero probability of missing deadline 606, processor A 601 may be selected because its mean completion time 603 is shorter than the mean completion time 604 of processor B 602.

Obtaining the distribution for the RIP execution time random variable Xi is based on an approximation of Xi with another discrete random variable Xi'. The approximation scheme illustrated in FIG. 7 can be interpreted as follows. Suppose that the Xi PDf 710 is as shown in graph 701 of FIG. 7. Note that Xi is defined on a finite interval, i.e., $P[l<Xi \leq h]=1$.

Figure 7:
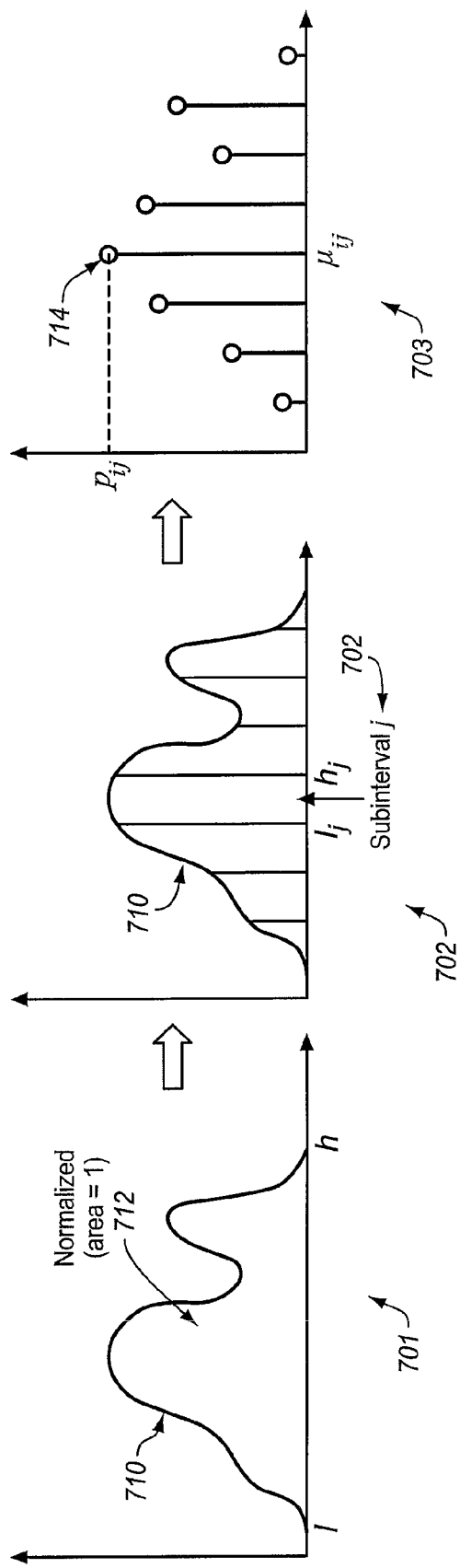
FIG. 7 shows exemplary analysis to identify discrete intervals in an exemplary probability distribution function for processing of an exemplary sheetside image.

The interval of PDf 710 from l to h can then be divided into m subintervals, as shown in graph 702 of FIG. 7. The area under the PDf curve 710 in graph 701 totals to a normalized probability of 1. The area under each interval (e.g., 704 of graph 702 of FIG. 7) j=1, ..., m is equal to the probability that the samples of Xi fall between $l_j$ and $h_j$ i.e., $$P[l_j < Xi \leq h_j] = \int_{\chi \in interval\, j} fx_i(\chi)d\chi$$

The transition from Xi to the discrete Xi' implies that the sample space of Xi in subinterval j=1, ..., m is substituted with a single mean value $\mu_{ij}$ 714 on graph 703 of FIG. 7. The value $\mu_{ij}$ is found as follows, $$\mu_{ij} = \frac{\int_{\chi \in interval\, j} \chi fx_i(\chi)d\chi}{\int_{\chi \in interval\, j} fx_i(\chi)d\chi}.$$

The probability of $\mu_{ij}$ is equal to $P[l_j<Xi\leq h_j]$.

The pair of $\mu_{ij}$ and $p_{ij}=P[l_j<Xi\leq h_j]$ can be represented as an impulse where $\mu_{ij}$ is the value of that impulse and $p_{ij}$ is the probability of that impulse. The entire set of impulses then fully describes Xi' for a sheetside. As noted above, the process to initially provide Xi' for each class or type of sheetside is beyond the scope of the present invention but may, for example, be provided as empirical data gathered from prior presentation of similar or identical sheetside images (or similar classes of sheetside images).

RIP Completion Time for a Sheetside in a Processor's Input Buffer

The above discussion exemplifies computation of probabilities for completion of a sheetside in the context of a single sheetside being processed by an available processor. In practice, processors will have a number of sheetsides already queued for processing in their respective input queue. Thus in practice to dispatch or assign a sheetside to a processor requires accounting for the possible completion times for each of the queued sheetsides for a processor. Thus a "considered" sheetside being evaluated for possible assignment or dispatch to a processor requires evaluation of the current PDf for other sheetside previously assigned to the processors.

As described below, the individual resultant RIP completion time impulse values can be calculated based on the mathematical method defined in the deterministic approach as taught in the sibling patent application. Individual sheetsides can be delayed in the input buffer of a particular processor due to the unavailability of space in the processor's output buffer—i.e., a sheetside cannot begin RIPping until there is adequate space in the processor's output buffer to hold the entire resultant bitmap. The prior sibling patent application deterministic mathematical model defined $\Delta_{out}[BQ_i^j]$ as the incurred delay from unavailability of output buffer space for sheetside i on processor j. The calculation of $\Delta_{out}[BQ_i^j]$ is dependent on the RIP completion time of the previous sheetside assigned to the processor and the earliest deadline of any bitmap in the processor's output buffer—i.e., the soonest a bitmap will be removed from that processor's output buffer. In the stochastic model of this patent, the impact of $\Delta_{out}[BQ_i^j]$ must be calculated for each RIP completion time impulse value separately. For example, if the previous sheetside has not yet completed RIPping its actual RIP completion time is not known and is a random variable represented with multiple impulses. Therefore, the value of $\Delta_{out}[BQ_i^j]$ may be different for each impulse value of the RIP completion time of that particular sheetside.

The probability associated with each RIP completion time impulse for a sheetside in the input buffer of a processor is the product of two probabilities. The first is the probability of a RIP execution time impulse for the sheetside. The second is the probability of a RIP completion time impulse of the previous sheetside. While the probability of the impulse is the product of these two probabilities, the value of the impulse depends on three elements: the value of the RIP completion time impulse for the previous sheetside, the value of the RIP execution time impulse of the sheetside, and the delay before processing ($\Delta_{out}[BQ_i^j]$).

In the stochastic model, there are four cases to be considered involving the application of $\Delta_{out}[BQ_i^j]$ to determining RIP completion time impulses. Each of the four cases involves a combination of states of the input and output buffers of each processor being evaluated for assignment of a considered sheetside.

The relevant states for the input buffer are whether the sheetside is at the head of the input buffer, or not. The following examples only will demonstrate how to determine the RIP completion time impulses for a sheetside that is either at the head or immediately following the head of the input buffer. The presented method can be readily applied by those of ordinary skill in the art to determine the RIP completion time impulses for sheetsides that are third or higher in the input buffer.

The relevant states for the output buffer are whether the output buffer can accommodate at least one more bitmap or is full. The presented examples will only demonstrate the cases where there is exactly one slot in the output buffer or the output buffer is full. However, the method is readily applicable to cases where the output buffer can accommodate more than a single new bitmap. Two assumptions are made in the presented examples: (1) a sheetside has just completed RIPping on the processor, and (2) the RIP completion time values being calculated are for a sheetside that is already in the input buffer of the processor. In the presented examples, the processor output buffers have a capacity of only three bitmaps but those of ordinary skill in the art will recognize simple changes to accommodate more or to accommodate compressed representations of bitmaps after generation thereof.

Dispatched Sheetside RIP Completion Time—Case 1

Figure 8:
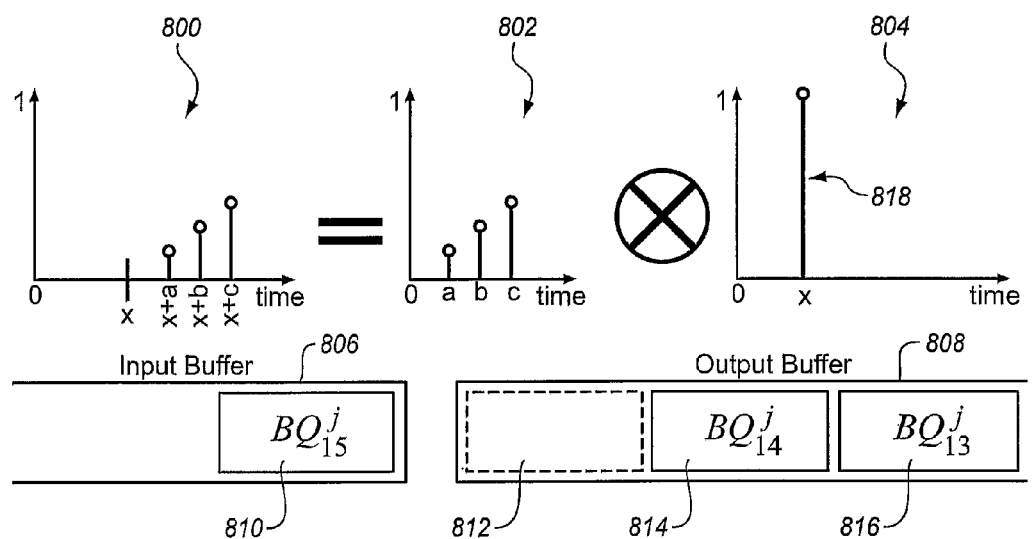
FIGS. 8 through 13 describe exemplary application of the stochastic mathematical model to an exemplary processing node (blade) in accordance with various exemplary processing states of the blade and in accordance with features and aspects hereof.

The simplest case arises when determining the RIP completion time impulses (i.e., the PDf) of the sheetside presently queued at the head of the input buffer of a processor when the output buffer of that processor can accommodate at least one additional bitmap. FIG. 8 presents an example of this case with exactly one sheetside 810 in the input queue 806 for a processor (processor "j"), two completed bitmaps 814 and 816 in the output queue 806 for processor j, and at least one available position 812 for storing another bitmap in the output queue 806. In this example, the only sheetside in the input buffer, when $BQ^j_{14}$ completes RIPping, is $BQ^j_{15}$. After a sheetside completes, its RIP completion time distribution has a single impulse with a RIP completion time value of $t_{comp}[BQ^j_i]$ and probability 1. When $BQ^j_{14}$ finishes RIPping, its actual RIP completion time becomes known and is given by $t_{comp}[BQ^j_{14}]$ ("x" 818 on PDf graph 804). In this example, there is capacity in the output buffer to accommodate an additional bitmap (812), and, by assumption, $BQ^j_{15}$ is already in the input buffer of processor j. Therefore, there is no delay to begin processing sheetside $BQ^j_{15}$—i.e., $\Delta_{out}[BQ_{15}{}^j]=0$. Therefore, the RIP completion time impulse values for $BQ^j_{15}$ in distribution graph 800 will each be equal to the addition of the RIP completion time for $BQ^j_{14}$ ("x" 818 on graph 804) and the corresponding RIP execution time impulse value for $BQ^j_{15}$ on distribution graph 802. This summation can be seen in FIG. 8, where $t_{comp}[BQ^j_{14}]=x$ (818) and $BQ^j_{15}$ has three RIP execution time impulses a, b, and c (graph 802). The resultant RIP completion time impulse values for $BQ^j_{15}$ are x+a, x+b, and x+c (graph 800).

Dispatched Sheetside RIP Completion Time—Case 2

Figure 9:
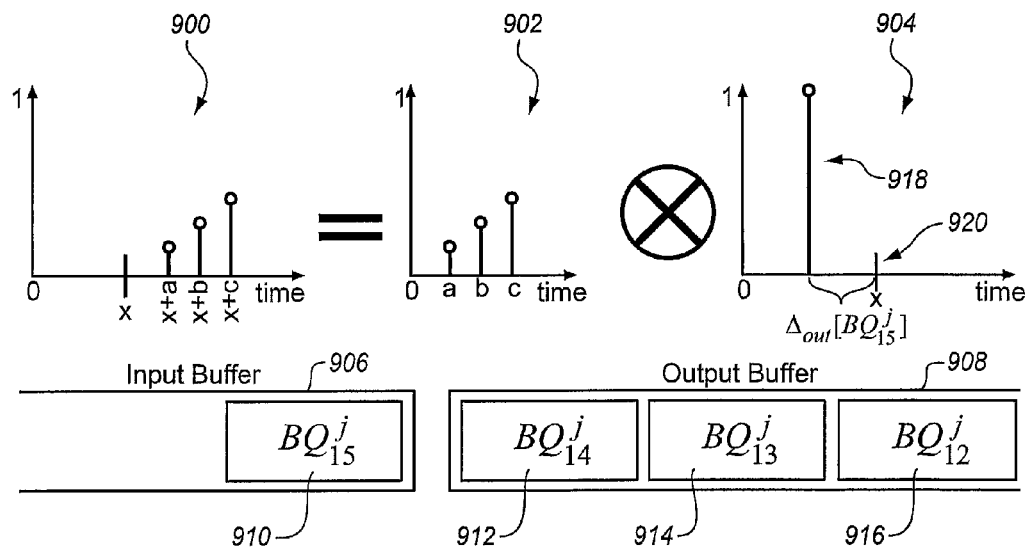

The second case for the application of $\Delta_{out}[BQ_i{}^j]$ occurs when calculating the RIP completion time impulses for the first sheetside in the input buffer and there are no free slots in the output buffer of the processor. FIG. 9 presents an example of this case with at least one sheetside 910 in the input buffer 906 and no remaining capacity in the output buffer 908 (it is filled by RIPped sheetsides 912, 914, and 916). In this example, unlike Case 1, when $BQ^j_{14}$ (912) completes RIPping there is no more capacity in the output buffer 908 of processor j. Therefore, $\Delta_{out}[BQ_{15}{}^j]$ is positive and given by $\Delta_{out}[BQ_{15}{}^j]=t_d[BQ_{12}{}^j]+t_{tran}{}^{bitmap}-t_{comp}[BQ_{14}{}^j]$ All of the arguments to this calculation are known when $\Delta_{out}[BQ_{15}{}^j]$ is calculated—recalling that $BQ^j_{14}$ has just completed and the deadline for $BQ^j_{12}$ is known. Therefore, $\Delta_{out}[BQ_{15}{}^j]$ has a single value and its application is relatively straightforward. For this case its application merely requires adding the value for $\Delta_{out}[BQ_{15}{}^j]$ to the RIP completion time of sheetside $BQ^j_{14}$. As can be seen in FIG. 9, this amounts to shifting $t_{comp}[BQ^j_{14}]$ along the time axis by $\Delta_{out}[BQ_{15}{}^h]$ (as seen in the offset between lines 918 and 920 on PDf graph 904). Therefore, the resultant RIP completion time impulse values for $BQ^j_{15}$ are again x+a, x+b, and x+c, where x is now equal to $t_{comp}[BQ_{14}{}^j]+\Delta_{out}[BQ_{15}{}^j]$.

Dispatched Sheetside RIP Completion Time—Case 3

Figure 10:
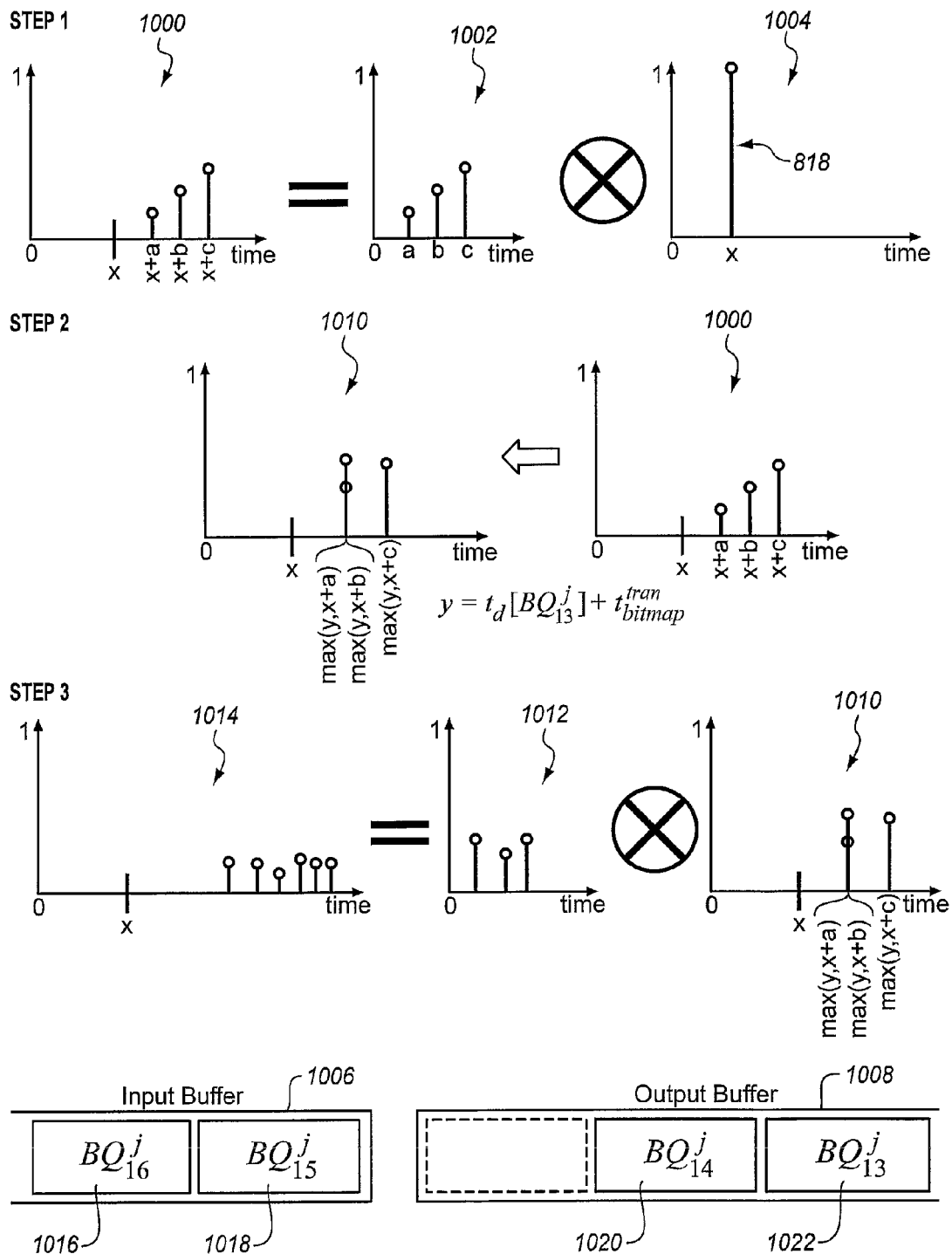

The third case for the application of $\Delta_{out}[BQ_i{}^j]$ occurs when calculating the RIP completion time impulses for a second sheetside in the input buffer when there is at least one free slot in the output buffer. FIG. 10 presents an example of this case, with two sheetsides (1016, 1018) in the input buffer 1006 and two bitmaps (1020, 1022) in the output buffer 1008. In the example, sheetside $BQ^j_{16}$ is the second sheetside in the input buffer 1006 and $BQ^j_{15}$ is at the head of the input buffer 1006. The first step in determining the RIP completion time impulses of sheetside $BQ^j_{16}$, depicted in FIG. 10 as "Step 1", is to find the RIP completion time impulses of $BQ^j_{15}$, as in Case 1 above. Thus, graphs 1000, 1002 and 1004 depict processing identical to graphs 800, 802, and 804 described above as "Step 1" in FIG. 8.

In Step 2 of Case 3, the $\Delta_{out}[BQ_i{}^j]$ values are applied to the RIP completion time impulses of sheetside $BQ^j_{i-1}$ to derive the $t^*_{start}[BQ^j_i]$ impulses. Recall from the mathematical model presented in the discrete model of the sibling patent application, the value of $\Delta_{out}[BQ_{16}{}^j]$ depends on whether $t_d[BQ_{13}{}^j]+t_{tran}{}^{bitmap} \leq t_{comp}[BQ_{15}{}^j]$.

However, in contrast to the deterministic case of the model of the sibling patent, in this stochastic case, $t^*_{comp}[BQ_i{}^j]$ is a random variable represented by multiple impulse values. In this example, $t^*_{comp}[BQ_{15}{}^j]$ has three possible impulse values corresponding to the three possible RIP execution time impulse values for sheetside $BQ^j_{15}$. Therefore, there may be three unique values of $\Delta_{out}[BQ_{16}{}^j]$.

Figure 11:
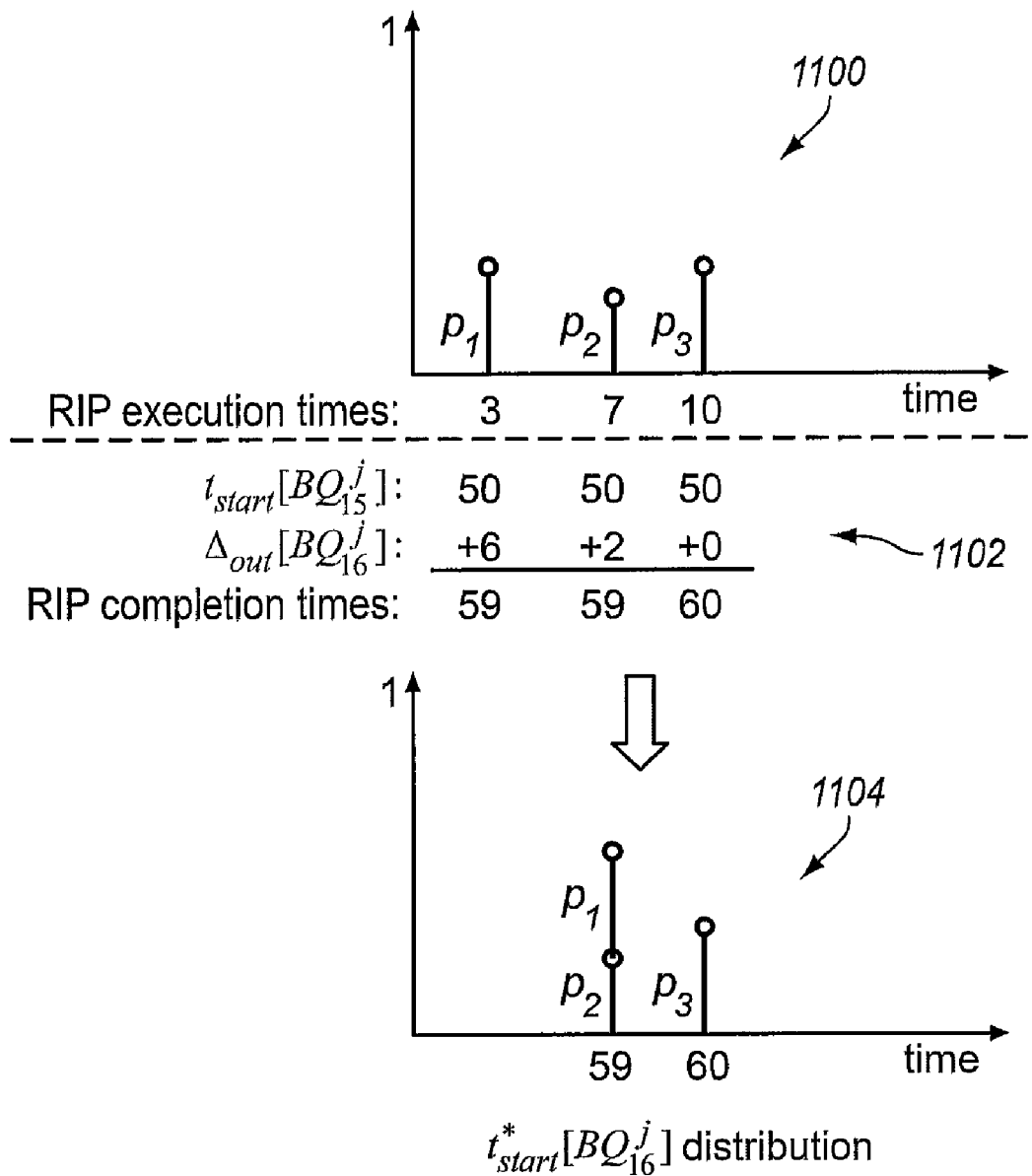

Consider this example with the following values as shown in FIG. 11: $t_{start}[BQ_{13}{}^j]=50$, $t_d[BQ_{13}{}^j]+t_{tran}{}^{bitmap}=59$, and let the three RIP execution time impulse values for sheetside $BQ^j_{15}$ be 3, 7, and 10. When the RIP execution time impulse value for $BQ^j_{15}$ is 3, then $\Delta_{out}[BQ_{16}{}^j]$ would be 6 because $t_d[BQ_{13}{}^j]+t_{tran}{}^{bitmap}-(t_{start}[BQ_{15}{}^j]+3)=6$. Similarly, if the RIP execution time impulse value for $BQ^j_{15}$ is 7 then $\Delta_{out}[BQ_{16}{}^j]$ would be 2 because $t_d[BQ_{13}{}^j]+t_{tran}{}^{bitmap}-(t_{start}[BQ_{15}{}^j]+7)=2$. However, if the RIP execution time impulse value for $BQ^j_{15}$ is 10 then $\Delta_{out}[BQ_{16}{}^j]$ would be 0 because $t_d[BQ_{13}{}^j]+t_{tran}{}^{bitmap}-(t_{start}[BQ_{15}{}^j]+10)=0$.

Recall, when calculating the $t_{comp}[BQ^j_i]$ for sheetside i, $\Delta_{out}[BQ_i{}^j]$ contributes to the $t_{start}[BQ^j_i]$ time for the sheetside. In FIG. 11, the impact on the $t^*_{start}[BQ^j_{16}]$ distribution can be seen. In this example, $\Delta_{out}[BQ_{16}{}^j]=0$ and $t_{start}[BQ_{15}{}^j]$ is known—i.e., $BQ^j_{14}$ has just completed. RIP completion times impulses for $BQ^j_{16}$ are computed as $t_{start}[BQ^j_{15}]$ plus $\Delta_{out}[BQ^j_{16}]$ generating impulse values (times) of 59, 59, and 60 as shown (1102 based on impulses from RIP execution times PDf 1100). Further, in this example, the $t^*_{start}[BQ^j_{16}]$ distribution 1104 is reduced to having only two impulses. This is because the $\Delta_{out}[BQ^j_{16}]$ values for RIP execution times of both 3 and 7 (p1 and p2) result in the same $t^*_{start}[BQ^j_{16}]$ value of 59. The resultant probability of this impulse is the sum of the two probabilities p1 and p2. Alternatively, as shown in Step 2 of FIG. 10, if $y=t_d[BQ_{13}{}^j]+t_{bitmap}{}^{tran}$; each impulse value of $t^*_{start}[BQ^j_{16}]$ is the max(y, impulse of $t_{comp}[BQ^j_{15}]$). If multiple impulses of $t^*_{start}[BQ^j_{16}]$ have the same value, they are combined into a single impulse by summing their probabilities. Regardless of the particular approach, distribution graph 1010 represents the distribution of times for $t^*_{start}[BQ^j_{16}]$ derived from the distribution of graph 1000.

Returning to FIG. 10, in Step 3 the RIP execution time impulses for sheetside $BQ^j_{16}$ 1012 are convolved with the $t^*_{start}[BQ^j_{16}]$ distribution 1010 to produce the RIP completion time distribution 1014 for sheetside $BQ^j_{16}$. In this example, that would result in a RIP completion time distribution with 6 impulses as shown in distribution graph 1014.

Dispatched Sheetside RIP Completion Time—Case 4

Figure 12:
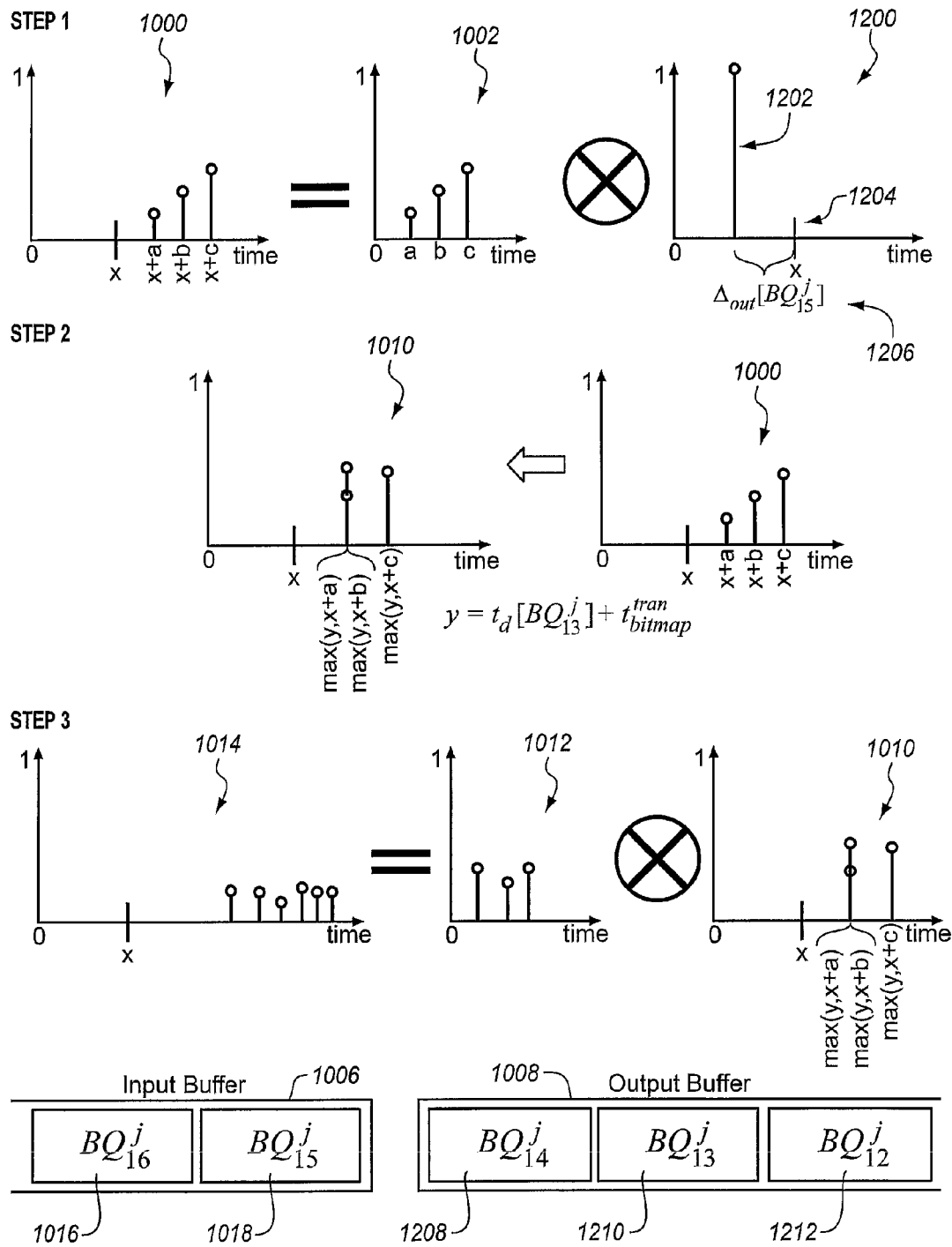

The final case to be considered for the application of $\Delta_{out}[BQ_i^j]$ occurs when calculating the RIP completion time impulses for a second sheetside in the input buffer and the output buffer is full. FIG. 12 presents an example of this case when there are two sheetsides 1016 and 1018 in the input buffer 1006 and the output buffer 1008 is full with sheetsides $BQ_{14}^j$ 1208, $BQ_{13}^j$ 1210, and $BQ_{12}^j$ 1212. In the example, sheetside $BQ_{16}^j$ 1016 is the second sheetside in the input buffer 1006 and $BQ_{15}^j$ 1018 is at the head of the input buffer 1006. The first step in determining the RIP completion time impulses of sheetside $BQ_{16}^j$, depicted in FIG. 12 as Step 1, is to find the RIP completion time impulses of $BQ_{15}^j$. This is identical to the procedure used to find the RIP completion time impulses of Case 2 above. In this example, when $BQ_{14}^j$ completes RIPping there is no more capacity in the output buffer of processor j. Recall from Case 2 that $\Delta_{out}[BQ_{15}^j]$ is positive and all of the arguments required to calculate it are known when $BQ_{14}^j$ completes. Therefore, $\Delta_{out}[BQ_{15}^j]$ has a single value and its application merely requires adding the value for $\Delta_{out}[BQ_{15}^j]$ to the RIP completion time of sheetside $BQ_{14}^j$. As can be seen in Step 1 of FIG. 12, this amounts to shifting $t_{comp}[BQ_{14}^j]$ along the time axis by $\Delta_{out}[BQ_{15}^j]$. Therefore, the resultant RIP completion time impulse values for $BQ_{15}^j$ are again x+a, x+b, and x+c, where x is now equal to $t_{comp}[BQ_{14}^j]+\Delta_{out}[BQ_{15}^j]$. In Step 2, $\Delta_{out}[BQ_{16}^j]$ is applied to determine the $t^*_{start}[BQ_{16}^j]$ distribution for the sheetside in exactly the same manner as in Step 2 of Case 3 above. In Step 3, the $t^*_{start}[BQ_{16}^j]$ distribution is convolved with the RIP execution time distribution of $BQ_{16}^j$ to produce its RIP completion time distribution.

RIP Completion Time for a Considered Sheetside to be Dispatched

Thus far a process was defined for calculating the RIP completion time impulses of a sheetside already mapped to a processor (e.g., already in a processor's input queue and awaiting processing to completion as a bitmap in that processor's output queue). That process is now extended to calculate the RIP completion time distribution for a considered sheetside at the head of the Head Node Input Queue (HNIQ). As discussed above and in the earlier sibling patent application, the Transfer Queue (TQ) from the Head Node to the RIP processors has a finite number of slots for storing sheetsides pending transfer. In the exemplary embodiments discussed herein, the TQ is assumed to have two slots.

The calculation of RIP completion times for a considered sheetside requires a "max" operator that converts two independent distributions into a single distribution reflecting the maximum of each combination of impulse values. The max convolution operator takes two discrete PDf distributions $X'_i$, $Y'_i$ as input and produces a resultant distribution $Z'_i$ as output—i.e., $Z'_i=\max\{X'_i, Y'_i\}$.

Figure 13:
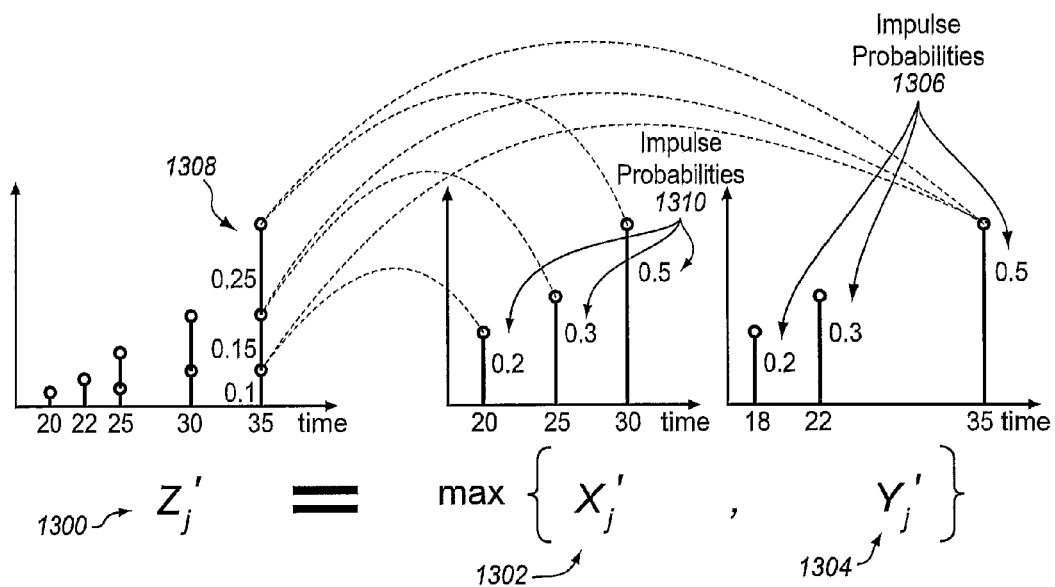
Figure 14:
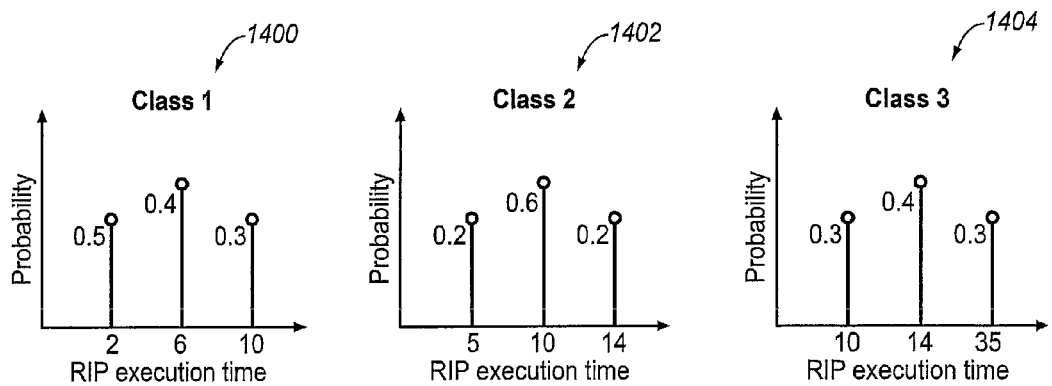
FIG. 14 depicts exemplary probability distribution functions for each of three exemplary classes of sheetside complexity.

FIG. 13 presents an example max calculation where the distributions labeled $X'_i$ 1302 and $Y'_i$ 1304 are combined using the max operator to produce the $Z'_i$ 1300 distribution. To compute the $Z'_i$ distribution each impulse value in the $Y'_i$ distribution is compared to each impulse value of the $X'_i$ distribution. Each resultant impulse value is equal to the maximum impulse value of the two compared values, and has a probability equal to the product of the probabilities of the compared impulses. If multiple resultant impulses share the same impulse value then their resultant probability products are summed. For example, in FIG. 13, comparing the impulse value 35 from the probabilities 1306 of the $Y'_i$ distribution 1304 to the impulse value 20 in the probabilities 1310 of the $X'_i$ distribution 1302 results in an impulse value of 35. As demonstrated in the figure, the resulting contribution to the probability of an impulse value of 35 in the $Z'_i$ distribution is the product of the probability of an impulse value of 35 from the $Y'_i$ distribution and the probability of an impulse value of 20 from the $X'_i$ distribution—i.e., 0.5×0.2=0.1. The impulse value 35 from the $Y'_i$ distribution is then compared to the remaining impulse values of the $X'_i$ distribution. In the example, the $Y'_i$ distribution's impulse value 35 is the maximum of all impulse values in the $X'_i$ distribution. Therefore, the probability products that result from comparing the impulse value 35 to the remaining impulse values of $X'_i$ are summed to produce an overall probability of 0.5=(0.2×0.5)+(0.3×0.5)+(0.5×0.5) (see 1308 and the curved lines representing the combinations of probability values as summed). In a similar manner, the remaining impulse values of $Y'_i$ are compared to all of the impulse values of $X'_i$ to produce the rest of the $Z'_i$ distribution.

In calculating the RIP completion time distribution for a considered sheetside, the max operator is used to find the earliest departure time from the Head Node to a specific processor. Define the random variable $t^*_{dept}[BQ_i^j]$ to be the earliest departure time of sheetside $BQ_i^j$ from the Head Node to processor j. In this subsection, it is assumed that all of the processor input buffers have space sufficient to store N sheetside description files of maximum possible file size; that is, there are slots available for N sheetside description files. Therefore, the earliest departure time for a sheetside is only dependent on the availability of a single slot in the input buffer of the considered processor and the time when the transmitter will be available to begin transferring the sheetside to the processors.

The time when the transmitter will be available to begin transferring the sheetside to the processors is determined by either the current time—if there are no sheetsides in the Transfer Queue—or by the time the sheetside at the head of the Transfer Queue began transferring plus the time required to transfer all sheetsides currently in the Transfer Queue. Define $t_{TQ}$ to be the time when the transmitter is available to begin transferring the considered sheetside from the Head Node TQ to the processors.

As discussed in the earlier sibling patent application, a sheetside can only be placed in the Transfer Queue of the Head Node when a slot is available for that sheetside in the input buffer of its destination processor. Therefore, $t_{TQ}$ is always a deterministic value. To apply the max operator when one operand is a deterministic value, the deterministic value can be treated as a discrete probability distribution function with a single impulse value with probability 1.

If a slot is unavailable in the input buffer of processor j for sheetside $BQ_i^j$, then the earliest possible departure time for the sheetside will be delayed until a slot is made available on processor j. The distribution for the earliest available slot in the input buffer of processor j is equivalent to the $t^*_{comp}[BQ_{i-N}^j]$ distribution. If a slot is available for $BQ_i^j$ in the input buffer of processor j then the earliest departure time is determined solely by $t_{TQ}$.

If a slot is unavailable in the input buffer of processor j and the transmitter is busy, then the earliest departure time of considered sheetside $BQ_i^j$ will be the result of the max operator applied to $t_{TQ}$ and $t^*_{comp}[BQ_{i-N}^j]$. Mathematically, $t^*_{dept}[BQ_i^j]=\max\{t^*_{ccomp}[BQ_{i-N}^j], t_{TQ}\}$. Herein above, the random variable $t^*_{start}[BQ_i^j]$ was defined to be $t^*_{start}[BQ_i^j]=t^*_{comp}[BQ_{i-1}^j]\otimes\Delta_{out}[BQ_i^j]$. As above, the assumption was made that sheetside $BQ_i^j$ was already in the input buffer of processor j, meaning that $t^*_{dept}[BQ_i^j]$ had already occurred. For a considered sheetside still present in the HNIQ, this is no longer true. Therefore, $t^*_{start}[BQ_i^j]$ must be restated in its general form to account for the earliest departure time for the sheetside from the Head Node to the processors as follows, $$t^*_{start}[BQ_i^j] = \max\{t^*_{comp}[BQ_{i\text{-}i}^j] \otimes \Delta_{out}[BQ_i^j], t^*_{dept}[BQ_i^j] + t_{trans}^{sdf}[BQ_i^j]\}$$

This equation then applies whether the sheetside is in the HNIQ or in processor j's input buffer.

The RIP completion time distribution is then given by the convolution of the $t^*_{start}[BQ^j_i]$ distribution with the RET $[BQ^j_i]$ distribution (i.e., RIP execution time distribution as discussed above). Mathematically, RIP completion time may be determined as:

$$t^*_{comp}[BQ_i^j] = RET^*[BQ_i^j] \otimes t^*_{start}[BQ_i^j]$$

Next, the described approach is applied to an example calculation of the RIP completion time distribution for a sheetside at the head of the HNIQ. All sheetsides in this example have one of the three exemplary RIP execution time distribution classifications depicted in FIG. 14. Specifically, three exemplary classes of PDf are shown 1400, 1402, and 1404. In PDf 1400, RIP execution time impulses for this "class 1" are 2, 6, and 10 units of time (e.g., seconds) having probabilities of 0.3, 0.4, and 0.3, respectively. Exemplary "class 2" 1402 has three impulses for RIP execution times as 5, 10, and 14 time units having probabilities 0.2, 0.6, and 0.2, respectively. Lastly, exemplary "class 3" 1404 shows three RIP execution time impulses as 10, 14, and 18 time units with probabilities 0.3, 0.4, and 0.3, respectively. Those of ordinary skill in the art will readily recognize that these exemplary classes (1400 through 1404) are merely exemplary of possible class definitions of sheetsides grouped as "low", "medium", and "high" complexity. Many additional classes may be defined and each class may provide a more or less complex PDf defining the execution time probability distributions. These classes may be defined by gathering of empirical data regarding past performance of similar sheetsides when a print job was previously executed. Or, the classes may be defined by any other suitable means for grouping the complexity of sheetside images into a number of classes each represented by a corresponding PDf.

Based on such classes of sheetside execution times, RIP completion time probability distributions may be determined for sheetsides being considered for assignment/dispatch to a processor. Four cases are discussed herein in the consideration of a new sheetside image to a processor (i.e., by the head node responsible for distributing sheetside images). In all exemplary cases that follow, the processor's input buffer has the capacity to store four sheetside description files. Throughout the following example, it is assumed that at the time the RIP completion time distributions are determined all RIP completion time impulses for previously mapped/dispatched but not yet RIPped sheetsides are still valid, i.e., the current time is less than all of the sheetside impulse values. The procedure for handling RIP completion time impulses that become invalid is discussed further herein below.

Figure 15:
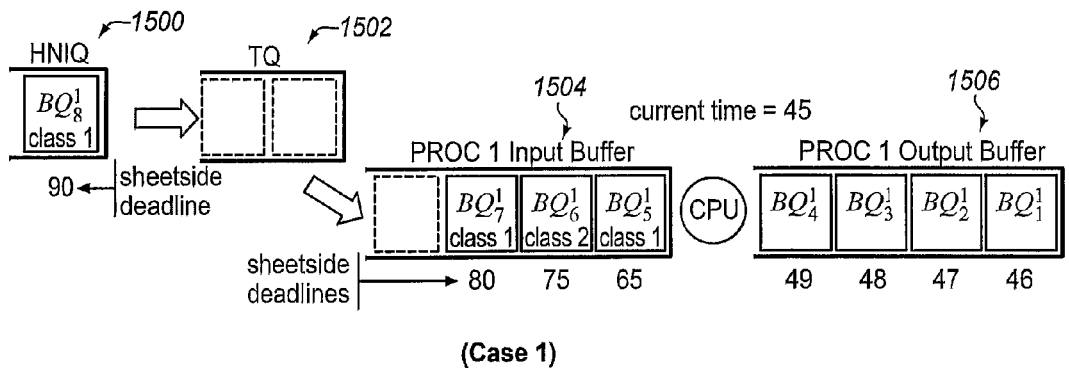
FIGS. 15 through 25 describe exemplary application of the stochastic mathematical model to an exemplary processing node (blade) in accordance with various exemplary processing states of the blade and the head node and in accordance with features and aspects hereof.

The four cases of this example are determined by the availability of the transmitter at the head node and the input buffer of an exemplary processor 1. The availability of the transmitter is determined by the state of the transfer queue (TQ). If the TQ is empty then the transmitter is idle and available at the current time. However, if the TQ is not empty then the transmitter will be available after all of the sheetsides in the TQ have completed transmission. The input buffer of a processor may or may not have a free slot to store the incoming sheetside description file. In Case 1 as shown in FIG. 15, the TQ 1502 is empty and the input buffer 1504 of the processor has at least one free slot. In Case 2 of FIG. 16, the Transfer Queue 1602 is empty but there are no free slots in the input buffer 1604. In Case 3 of FIG. 17, the Transfer Queue 1702 has at least one sheetside description file already in the queue and the input buffer 1704 has at least one free slot. In Case 4 of FIG. 18, there is at least one sheetside description file already in the Transfer Queue 1802 and the input buffer 1804 has no free slots.

In all four exemplary cases, processor 1 is considered for possible assignment of a sheetside in the head node input queue. Since in all exemplary cases, processor 1 is under consideration, the designation BQn will be understood as synonymous with $BQ^1_n$, where n is a sheetside number.

Considered Sheetside RIP Completion Time—Case 1

FIG. 15 presents the system state at time 45 for Case 1. It is assumed that sheetside BQ4 has just completed RIPping, sheetside BQ5 is just about to begin RIPping, and sheetside BQ8 is at the head of the HNIQ 1500. Each sheetside's deadline is depicted in the figure immediately below the sheetside designation. In this case, the Transfer Queue 1502 is empty and there is a free slot in the input buffer 1504.

This is the simplest case to calculate the RIP completion time distribution of the considered sheetside because the transmitter is available and there is a free slot in the input buffer of the destination processor. In this case, the RIP completion time distribution for BQ8 is simply the convolution of the RET[BQ8] distribution with the RIP completion time distribution of sheetside BQ7. Therefore, the RIP completion time distribution for sheetside BQ8 is:

$$t^*_{comp}[BQ_8^1] = t^*_{comp}[BQ_7^1] \otimes RET^*[BQ_8^1]$$

This corresponds to equations above, where for this case, $\Delta_{out}[BQ_8^1]=0$,
$t^*_{dept}[BQ_8^1]=t_{TQ}$=current time, and
$t_{TQ}+t_{trans}^{sdf}[BQ_8^1]$<all values in $t^*_{comp}[BQ_7^1]$.

In this case, the input buffer 1504 of processor 1 is assumed to contain three sheetsides (BQ5, BQ6, and BQ7). If the input buffer 1504 of processor 1 were empty, i.e., the processor was idle, then the required time to transfer sheetside BQ8 to processor 1 cannot be hidden by the RIPping of another sheetside. Therefore, the RIP completion time of sheetside BQ8 would be determined by combining its RIP execution time distribution with the deterministic value $t_{trans}^{sfd}[BQ_8^1]$ and the current time as follows, $$t^*_{comp}[BQ_8^1]=\text{current time} \otimes t_{tran}^{sdf}[BQ_8^1] \otimes RET^*[BQ_8^1].$$

Considered Sheetside RIP Completion Time—Case 2

Figure 16:
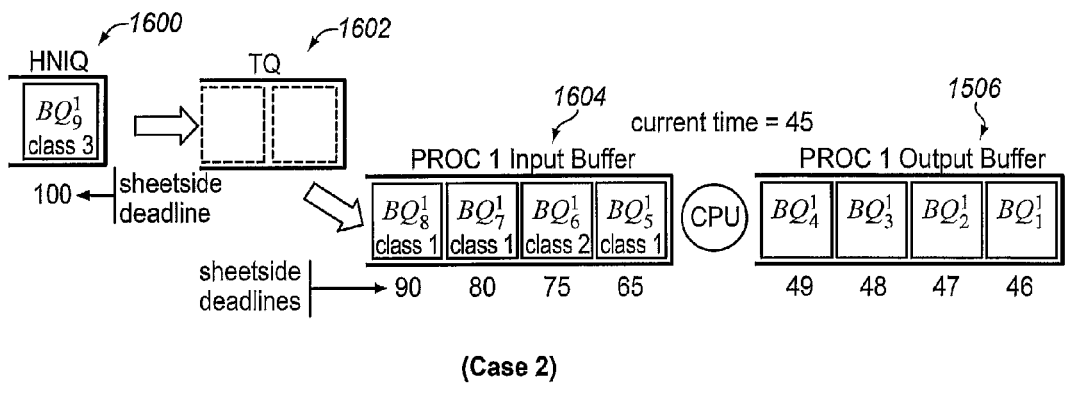

FIG. 16 presents the system state at time 45. It is assumed that sheetside BQ4 has just completed RIPping in output buffer 1606, sheetside BQ5 is just about to begin RIPping from input buffer 1604, and sheetside BQ9 is at the head of the HNIQ 1600. Each sheetside's deadline is depicted in the figure immediately below the sheetside.

Figure 19:
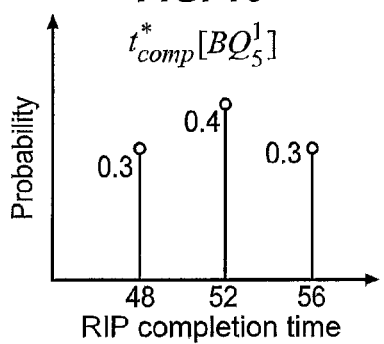
Figure 20:
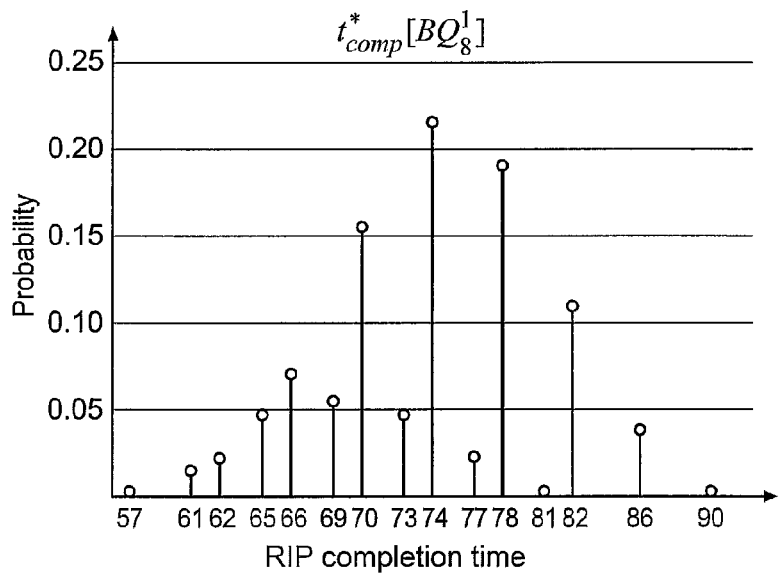

To calculate the RIP completion time of sheetside BQ9 on processor 1 requires the distribution for the earliest possible time that the sheetside can be available in the input buffer 1604. To determine this distribution requires the earliest possible departure time for the sheetside from the HNIQ 1600 to processor 1. The earliest possible departure time is obtained by applying the max convolution operator to compare the RIP completion time for sheetside BQ5—the sheetside at the head of the input buffer 1604 of the processor—and the time when the transmitter will be available to transfer the sheetside to the processor. In this example, the Transfer Queue 1602 of the Head Node is empty, meaning that the transmitter is available immediately to transfer the sheetside. Therefore, $t_{dept}[BQ9]$ is determined solely by the RIP completion time distribution of sheetside BQ5. Sheetside BQ5 is, for example, a class 1 sheetside, as described earlier, and the output buffer 1606 of processor 1 is full. Therefore, the next available slot in the output buffer 1606—required to begin RIPping sheetside BQ5—occurs at time 46, the deadline of sheetside BQ1. Therefore, $\Delta_{out}[BQ5]=1$ and $t^*_{comp}[BQ5]$ is as depicted in FIG. 19.

Assume that the time required to transfer sheetside BQ9 to processor 1 is 2 time units. Combining this time with $t_{dept}[BQ9]$ gives the distribution for when BQ9 will be available in the input buffer 1604 to begin RIPping. The resultant distribution for the earliest time that sheetside BQ9 can be available in the input buffer 1604 is then combined with the RIP completion time distribution of sheetside BQ8 by applying the max operator. The RIP completion time distribution for sheetside BQ8 is presented in FIG. 20; the details of the calculation are left out here as they are identical to those discussed as case 4 in the RIP Completion Time examples above.

Figure 21:
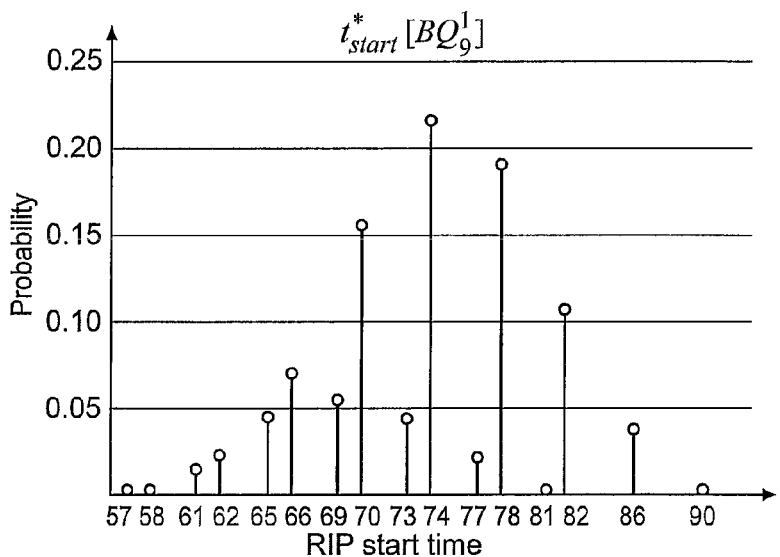
Figure 22:
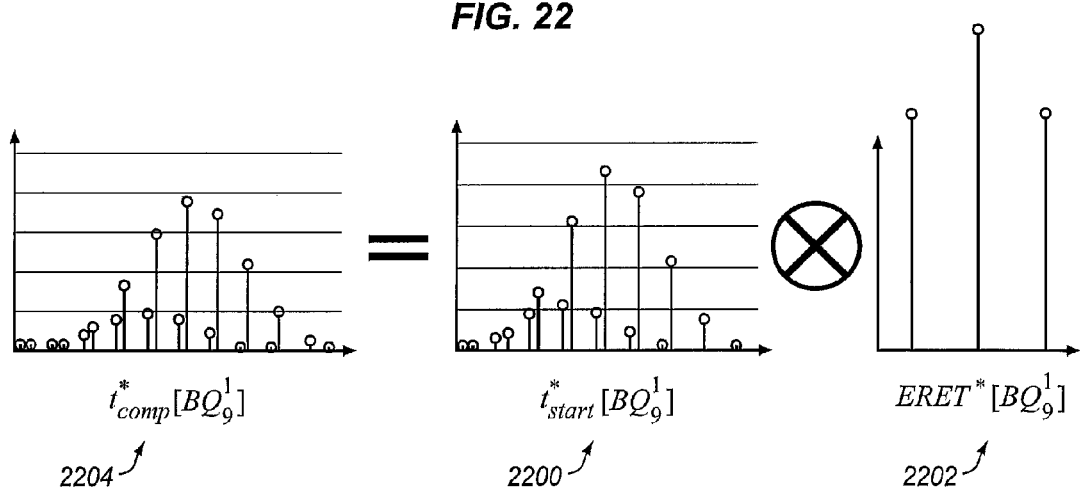
Figure 23:
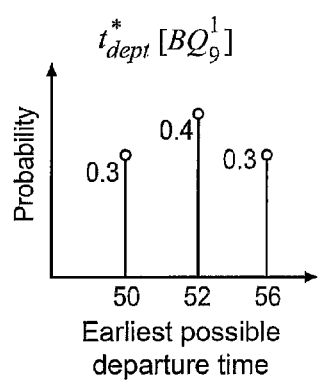

Applying the max operator to the availability distribution of BQ9 (FIG. 19 shifted by $t_{tran}^{sdf}[BQ_8^1]=2$ time units) and the RIP completion time of BQ8 $t^*_{comp}[BQ8]$ (FIG. 20) produces the $t^*_{start}[BQ9]$ distribution. FIG. 21 presents the distribution for the start time of sheetside BQ9, $t^*_{start}[BQ9]$ The final step in producing the RIP completion time distribution for BQ9 on processor 1 (2204 as shown in FIG. 22) is to convolve the $t^*_{start}[BQ9]$ distribution 2200 with the RET[BQ9] 2202 distribution.

Considered Sheetside RIP Completion Time—Case 3

Figure 17:
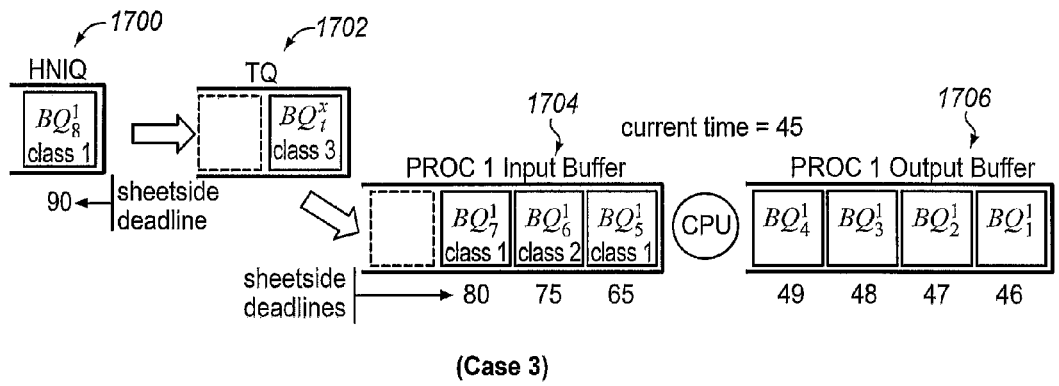

In Case 3, depicted in FIG. 17, there is currently a free slot in the input buffer 1704 and TQ 1702 is non-empty. Sheetside BQ4 has just completed RIPping into output buffer 1706, sheetside BQ5 in input buffer 1704 is ready to begin RIPping, and sheetside BQ8 is at the head of the HNIQ 1702.

As in Case 2, to determine the RIP completion time distribution for the sheetside at the head of the HNIQ 1702 requires first determining the earliest possible departure time from the Head Node to the processors. In this exemplary case, a slot is available immediately in the input buffer 1704 of processor 1 and the transmitter is currently busy.

To find $t_{TQ}$ requires the start time for the current transmission of sheetside $BQ^x_i$ and $t_{tran}^{sfd}[BQ_i^x]$. The sum of these two values determines when the transmitter will be available to transfer sheetside BQ8. Assume the sheetside currently being transmitted $BQ^x_i$ requires 6 time units to transfer and the transfer began at time 44—i.e., the transmission will complete at time 50 and $t_{TQ}=50$. Therefore, the earliest possible departure time is solely determined by $t_{TQ}$, i.e., $t_{dept}[BQ8]=t_{TQ}$.

The earliest start time for sheetside BQ8 is given by the maximum of $t_{dept}[BQ8]$ and $t^*_{comp}[BQ7]$. In this case, $t_{dept}[BQ8]$ is a deterministic value and needs to be combined with the $t^*_{comp}[BQ7]$ distribution using the max operator. As stated previously, this can be done by treating the deterministic $t_{dept}[BQ8]$ value as a discrete probability distribution function that has a single impulse value with probability 1.

The final step to produce $t^*_{comp}[BQ8]$ is to convolve the $t^*_{start}[BQ8]$ distribution with the RET[BQ8] distribution as follows, $$t^*_{comp}[BQ_8^1]=t^*_{start}[BQ_8^1] \otimes RET^*[BQ_8^1]$$

In this case, the input buffer 1704 was assumed to contain three sheetsides. If the input buffer 1704 of processor 1 was empty, i.e., the processor was idle, then the RIP completion time of sheetside BQ8 would instead be determined by combining its RIP execution time distribution with the deterministic value $t_{TQ}$ as follows, $$t^*_{comp}[BQ_8^1]=t_{TQ} \otimes RET^*[BQ_8^1]$$

Considered Sheetside RIP Completion Time—Case 4

Figure 18:
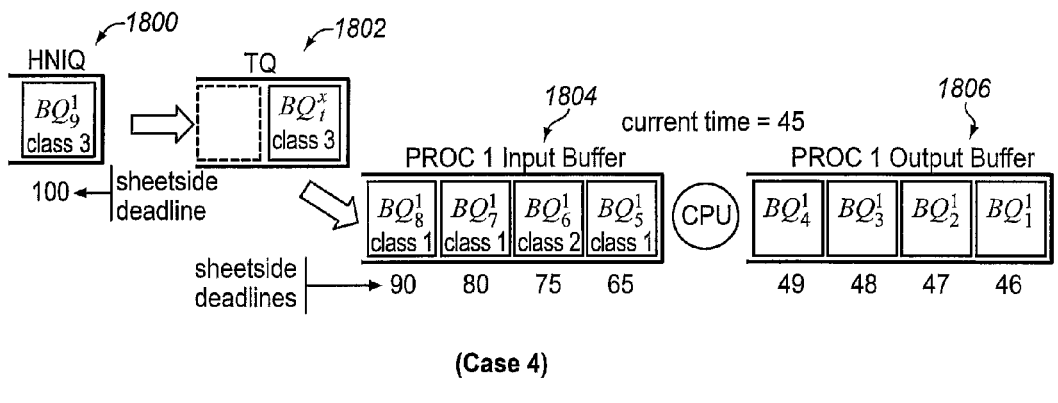

In Case 4, depicted in FIG. 18, the input buffer 1804 is full and TQ 1802 is non-empty. Assume the transmitter is currently busy transferring sheetside $BQ^x_i$ to processor $x \neq 1$. Sheetside BQ4 has just completed RIPping into output buffer 1806, sheetside BQ5 in input buffer 1804 is just about to begin RIPping, and sheetside BQ9 is at the head of the HNIQ 1802.

To calculate the RIP completion time of sheetside BQ9 on processor 1 requires the distribution for the earliest possible time that the sheetside can be available for RIPping in the input buffer 1804 of processor 1. To determine this distribution requires the earliest possible departure time for the sheetside from the Head Node to processor 1. As stated earlier, the earliest possible departure time is obtained by applying the max operator to compare the RIP completion time for sheetside BQ5—the sheetside at the head of the input buffer 1804 of the processor—with the time when the transmitter will be available to transfer the sheetside to the processor. In this example, the transmitter is busy sending sheetside $BQ^x_i$ to processor $x \neq 1$. Therefore, $t^*_{dept}[BQ9]$ is determined by the max of the RIP completion time distribution of sheetside BQ5 and the deterministic value $t_{TQ}$.

To find $t_{TQ}$ requires the start time for the current transmission of sheetside $BQ^x_i$ and $t_{tran}^{sdf}[BQ_i^x]$. The sum of these two values determines when the transmitter will be available to transfer sheetside BQ9. In this example, $t_{TQ}$ is assumed to have a value of 50. The value of $t_{TQ}$ is then compared to the impulse values of $t^*_{comp}[BQ5]$ to define $t^*_{dept}[BQ9]$ i.e., $t^*_{dept}[BQ9]$ is determined by the max of the RIP completion time distribution of sheetside BQ5 and the deterministic value $t_{TQ}$. Presume sheetside BQ5 has a class 1 RIP execution time distribution, defined previously, and the output buffer 1806 of processor 1 is currently full. Therefore, the next available slot in the output buffer—required to begin RIPping sheetside BQ5—occurs at time 46, the deadline of sheetside BQ1. Thus, with current time=45, $\Delta_{out}[BQ5]=1$ and $t^*_{comp}[BQ5]$ is as depicted in FIG. 19 discussed above. Applying the max operator to $t_{TQ}$ and $t^*_{comp}[BQ5]$ produces the $t^*_{dept}[BQ9]$ distribution depicted in FIG. 23.

Figure 24:
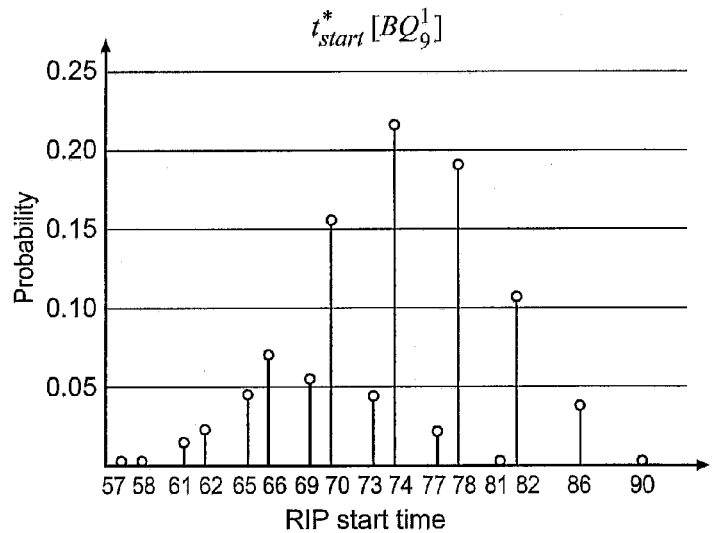
Figure 25:
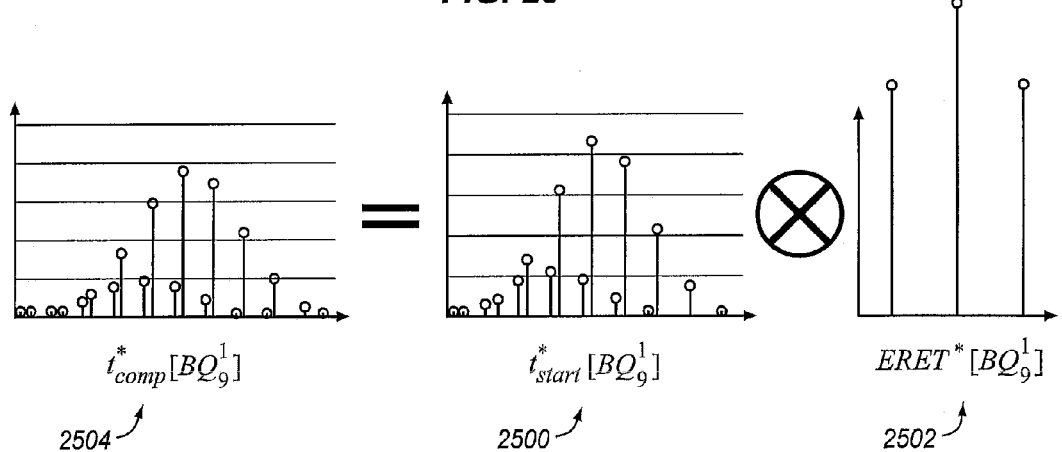

The time required to transfer sheetside BQ9 to processor 1 is assumed to be 2 time units. Combining this time with $t^*_{dept}[BQ9]$ gives the distribution for when BQ9 will be available in the input buffer 1804. The resultant distribution for the earliest time that sheetside BQ9 can be available in the input buffer 1804 of processor 1 is then combined with the RIP completion time distribution of sheetside BQ8 by applying the max operator. The RIP completion time distribution for sheetside BQ8 is presented in FIG. 20 as discussed above. Applying the max operator to the availability distribution of BQ9 and the RIP completion time of BQ8 produces the $t^*_{start}[BQ9]$ distribution. FIG. 24 presents the distribution for the start time of sheetside BQ9.

The final step in producing the RIP completion time distribution for BQ9 on processor 1 (2504 of FIG. 25) is to convolve the $t^*_{start}[BQ9]$ distribution 2500 with the RET[BQ9] distribution 2502.

Sheetside Dispatch Method Applying Stochastic Model

Figure 26:
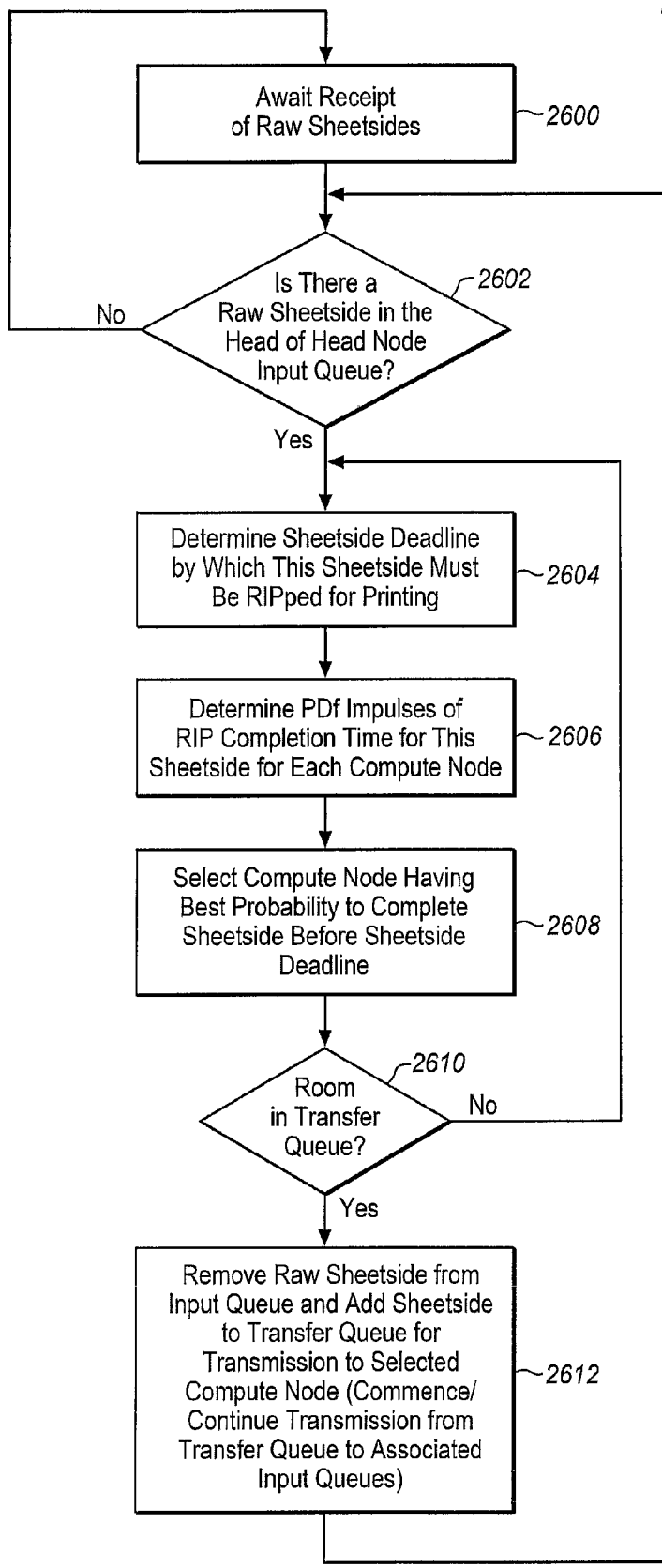
FIGS. 26 through 27 are flowcharts describing exemplary methods in accordance with features and aspects hereof for dispatching sheetsides to clustered processors in accordance with features and aspects hereof by applying a stochastic mathematical model.

FIG. 26 is a flowchart providing additional exemplary details of a method in accordance with features and aspects hereof to improve dispatching of raw sheetsides in a print controller system having a plurality of processors (compute nodes). The method of FIG. 6 may be performed within a controlling node or a processor such as the head node discussed above. In general, the method of FIG. 26 utilizes the mathematical model described above to compute a probability distribution functions (PDf) for each processor to determine the best processor to which a given sheetside should be dispatched.

Step 2600 awaits receipt of one or more raw sheetsides from the raw datastream parser. As noted above, each sheetside comprises a collection of data in an encoded form such as a page description language (e.g., HP PCL, Adobe Postscript, IBM IPDS, etc.) or a display list. Each raw sheetside comprises a sequence of such encoded data to represent a single sheet independent of all other sheets. The independence of each raw sheetside allows the head node to distribute sheetside processing among the plurality of compute node processors operating in parallel. Received raw sheetsides may be stored in a spool or input queue associated with the head node until such time as the head node is ready to process them. The received raw sheetsides will be processed in order of their receipt from the attached servers/host systems.

Step 2602 next determines whether there are raw sheetsides in the spool or queue associated with the head node. If not, processing returns to step 2600 to await receipt of additional raw sheetsides to be processed. If there is a raw sheetside in the spool or input queue for the head node, step 2604 determines the sheetside deadline for this next sheetside to be processed. As noted above, each sheetside must be processed by a time certain to avoid stoppage or other performance degradation of the printing system. Step 2606 next determines the probability distribution of impulse RIP completion times for this new sheetside for each of the processors. As noted above, the PDf function used to determine the impulses is presumed to be known as associated with the sheetside. In one preferred approach, the sheetside may be classified as regards complexity and may thus be associated with a PDf based on historical, empirical data regarding processing of such a sheetside. Alternatively, a PDf may be associated with a particular sheetside also, for example, based on prior historical data for processing of this particular sheetside.

As thoroughly discussed above in the stochastic mathematical model hereof, the RIP execution time impulse values for this considered sheetside will vary for each processor based on the processing state of that processor. Where earlier sheetsides are already buffered in the input queue of a processor waiting to be completed, determination of the RIP completion time impulses for this sheetside requires determining the RIP completion time probability impulses for each of those earlier sheetsides already dispatched. All these exemplary computations and various combinations of possible states are discussed above in detail.

Further, as noted above, the processing power of each processor may be presumed to be uniform (i.e., a homogenous collection of processors). Where the processors' capabilities vary, the above discussed computations may be adjusted for the processing power of each processor.

Step 2608 next selects the "best" processor based on the probability impulse values computed for this sheetside for each processor. As above, the best is determined as the processor most likely to complete the sheetside with a minimum RIP completion time. Or, viewed another way, the processor least likely to miss the sheetside deadline.

Step 2610 then confirms that there is space in the transfer queue of the head node (control processor) to store the sheetside for transfer to the selected processor (thereby effectuating the dispatch of the sheetside to that selected, best processor. If there is at present no room for the sheetside, processing loops back to step 2604 continually re-evaluating the deadline and the probabilities of each impulse for a possible RIP completion time. By re-evaluating the criteria, changes in the operating status of the system may be factored into the selection process. If there is presently sufficient room for the sheetside to be dispatched through the transfer queue, step 2612 moves the sheetside from the head node's input queue to the transfer queue for transfer to the selected processor. Background processing to transfer sheetsides from the transfer queue to the appropriate input queues/buffers of selected processors is commenced or continued by step 2612. Thus, previously or newly dispatched sheetsides are transferred to the selected processors as new sheetsides are analyzed. Processing continues looping back to step 2602 to process a next sheetside (if any) in the input queue of the head node.

Figure 27:
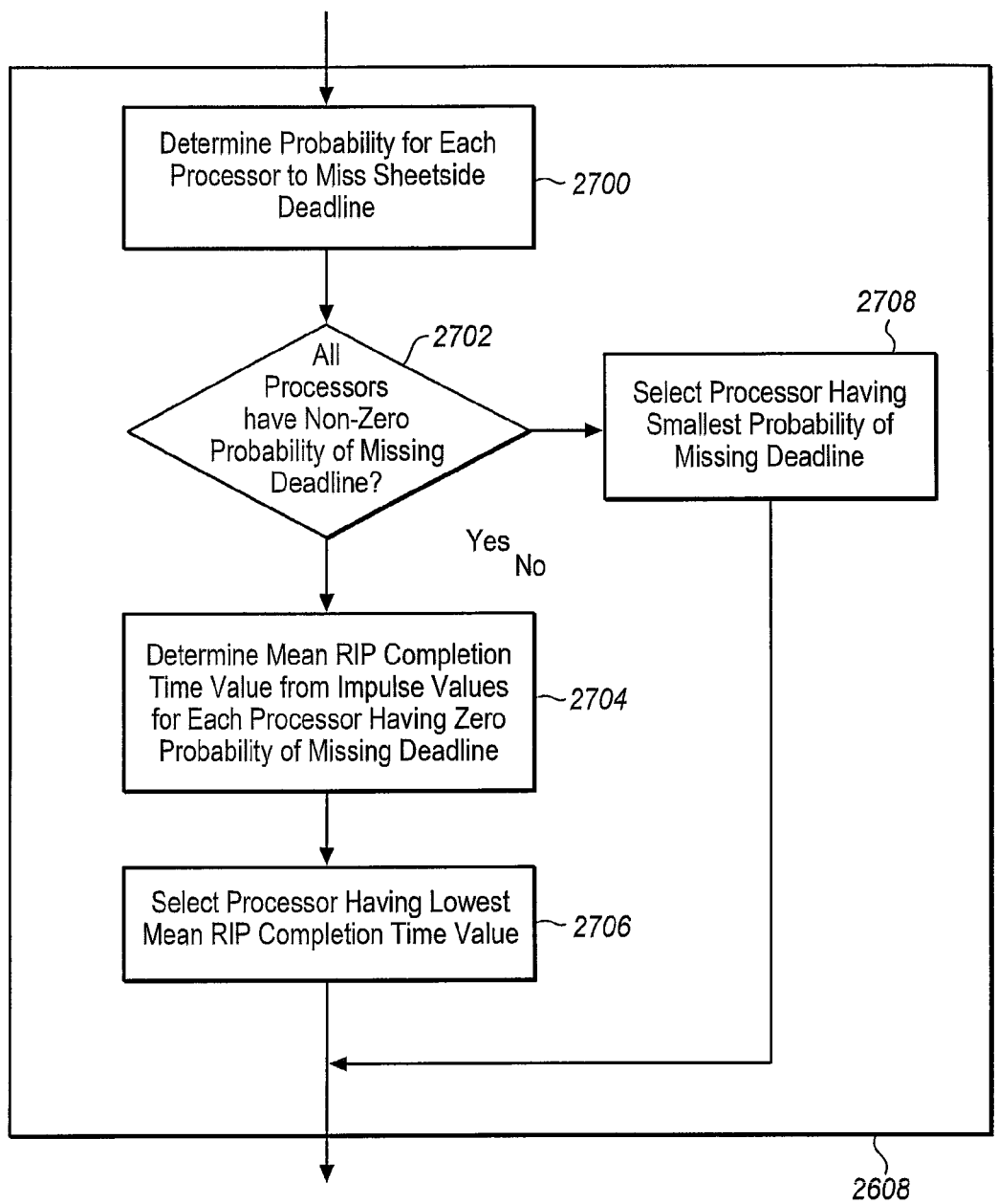

FIG. 27 provides exemplary additional details of the processing of step 2608 of FIG. 26 to select a "best" processor based on the computed RIP completion time impulse values. Step 2700 first determines from the PDf for each processor for this sheetside the probability that each processor will miss the sheetside deadline for this sheetside. The probability that the sheetside will miss its deadline on a processor is given by the area under the PDf curve for the processor corresponding to a RIP completion time greater than the sheetside deadline, i.e., the area under the portion of the curve that lies to the right of the sheetside's deadline in the exemplary graphs discussed above. Step 2702 then determines whether all processors have a non-zero probability of missing the deadline. If so, step 2704 selects among all processors the processor having the lowest probability of missing the sheetside deadline for this sheetside.

If at least one processor has a zero probability of missing the sheetside deadline for this sheetside, step 2706 next determines the average RIP completion time for all of those processors having a zero probability of missing the deadline. From among those processors having a zero probability of missing the deadline, the processor having the smallest average (mean) RIP completion time for the sheetside is selected by step 2708.

Other heuristics may be employed to distinguish among the various processors based on the computed probability impulse values to select a preferred processor to which the sheetside will be dispatched. Thus the steps of FIG. 27 are intended merely as representative of one exemplary embodiment of features and aspects hereof to select a best processor based on probabilities of the various processors completing a sheetside with minimum RIP completion time.

Figure 28:
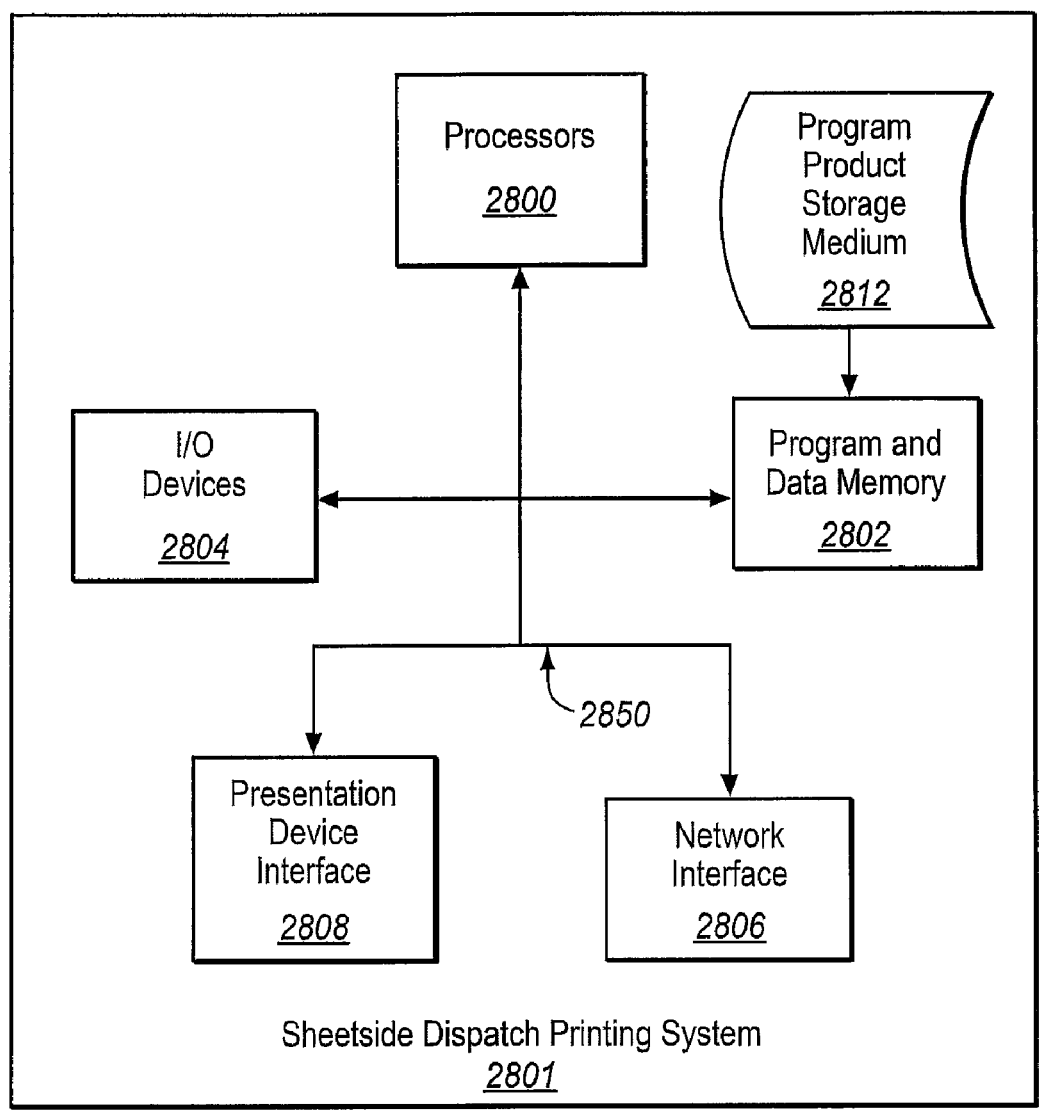
FIG. 28 is a block diagram of a system that processes methods in accordance with features and aspects hereof that are embodied on a computer readable medium.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 28 is a block diagram depicting a sheetside dispatch printing system 2801 as a system adapted to provide features and aspects hereof by executing programmed instructions and accessing data stored on a computer readable storage medium 2812.

Furthermore, the invention can take the form of a computer program product accessible from a computer-usable or computer-readable medium 2812 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 2800 coupled directly or indirectly to memory elements 2802 through a system bus 2850. The memory elements can include local memory employed during actual execution of the program code, bulk storage, and cache memories which provide temporary storage of at least some program code in order to reduce the number of times code must be retrieved from bulk storage during execution.

Input/output or I/O devices 2804 (including but not limited to keyboards, displays, pointing devices, etc.) can be coupled to the system either directly or through intervening I/O controllers. Network adapter interfaces 2806 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 2808 may be coupled to the system to interface to one or more presentation device such as printing systems and displays for presentation of presentation data generated by system 2801.

Although specific embodiments were described herein, the scope of the invention is not limited to those specific embodiments. The scope of the invention is defined by the following claims and any equivalents thereof.

We claim:

1. A method for distributing sheetside processing in a cluster computing printer controller of a print system, the method comprising:
   receiving a print job comprising multiple sheetsides; and
   for each sheetside, performing the steps of:
   determining a probability distribution function (PDf) of a range of estimated RIP completion times for said each sheetside for each processor of multiple processors in the printer controller; and
   dispatching said each sheetside to a selected processor of the multiple processors based on the PDf such that said each sheetside has the highest probability of completing at a minimum RIP completion time.

2. The method of claim 1 further comprising:
   determining a sheetside deadline for said each sheetside by which time said each sheetside must be RIPped to avoid stoppage of printing by the print system,
   wherein the step of dispatching further comprises:
   selecting the selected processor by comparing information derived from the PDf of said each processor for said each sheetside with said sheetside deadline to select the processor most likely to complete RIPping of the sheetside before the sheetside deadline.

3. The method of claim 2
   wherein the step of selecting further comprises:
   determining that the PDf of said each processor for said each sheetside has a non-zero probability of failing to complete RIPping of said each sheetside before the sheetside deadline; and
   responsive to determining that said each processor has a non-zero probability of missing the sheetside deadline, selecting the processor having the lowest probability of missing the sheetside deadline.

4. The method of claim 2
   wherein the step of selecting further comprises:
   determining that the PDf of one or more processors for said each sheetside has a zero probability of failing to complete RIPping of said each sheetside before the sheetside deadline; and
   responsive to determining that said one or more processors has a zero probability of missing the sheetside deadline, performing the further steps of:
   determining the mean RIP completion time from the PDf of said one or more processors for said each sheetside; and
   selecting the processor from among the one or more processors having the smallest mean RIP completion time.

5. The method of claim 1
   wherein each of the multiple processors has an input queue adapted to receive sheetsides to be RIPped that were previously dispatched to the processor,
   wherein each of the multiple processors dequeues a next sheetside to be processed from its input queue, and
   wherein the step of dispatching further comprises:
   storing the sheetside in the input queue of the selected processor.

6. The method of claim 5
   wherein the step of determining further comprises:
   determining said PDf for said each sheetside for each processor of multiple processors in the printer controller based on a PDf for each sheetside presently residing in the input queue of said each processor.

7. A computer readable medium tangibly embodying programmed instruction which, when executed by a computer, perform a method for distributing sheetside processing in a cluster computing printer controller of a print system, the method comprising:
   receiving a print job comprising multiple sheetsides; and
   for each sheetside, performing the steps of:
   determining a probability distribution function (PDf) of a range of estimated RIP completion times for said each sheetside for each processor of multiple processors in the printer controller; and
   dispatching said each sheetside to a selected processor of the multiple processors based on the PDf such that said each sheetside has the highest probability of completing at a minimum RIP completion time.

8. The medium of claim 7 the method further comprising:
   determining a sheetside deadline for said each sheetside by which time said each sheetside must be RIPped to avoid stoppage of printing by the print system,
   wherein the step of dispatching further comprises:
   selecting the selected processor by comparing information derived from the PDf of said each processor for said each sheetside with said sheetside deadline to select the processor most likely to complete RIPping of the sheetside before the sheetside deadline.

9. The medium of claim 8
   wherein the step of selecting further comprises:
   determining that the PDf of said each processor for said each sheetside has a non-zero probability of failing to complete RIPping of said each sheetside before the sheetside deadline; and
   responsive to determining that said each processor has a non-zero probability of missing the sheetside deadline, selecting the processor having the lowest probability of missing the sheetside deadline.

10. The medium of claim 8 wherein the step of selecting further comprises:

determining that the PDf of one or more processors for said each sheetside has a zero probability of failing to complete RIPping of said each sheetside before the sheetside deadline; and responsive to determining that said one or more processors has a zero probability of missing the sheetside deadline, performing the further steps of:

determining the mean RIP completion time from the PDf of said one or more processors for said each sheetside; and selecting the processor from among the one or more processors having the smallest mean RIP completion time.

11. The medium of claim 7 wherein each of the multiple processors has an input queue adapted to receive sheetsides to be RIPped that were previously dispatched to the processor, wherein each of the multiple processors dequeues a next sheetside to be processed from its input queue, and wherein the step of dispatching further comprises:

storing the sheetside in the input queue of the selected processor.

12. The medium of claim 11 wherein the step of determining further comprises:

determining said PDf for said each sheetside for each processor of multiple processors in the printer controller based on a PDf for each sheetside presently residing in the input queue of said each processor.

13. A system comprising:

a head node adapted to receive data representing a plurality of raw sheetsides to be RIPped to generate a corresponding plurality of RIPped sheetsides;

a plurality of processors communicatively coupled to the head node, each processor adapted to process a raw sheetside to generate a corresponding RIPped sheetside; and a plurality of printhead interfaces for receiving a RIPped sheetside for marking on an image marking engine, wherein each of the plurality of printheads is controllably coupled to any of the plurality of processors to receive a RIPped sheetside, wherein the head node is adapted to dispatch a raw sheetside to a selected processor of the plurality of processors, and wherein the head node is adapted to select the selected processor by:

determining a range of estimated RIP completion times for each of the plurality of processors to generate said RIPped sheetside from said raw sheetside, determining a probability distribution function (PDf) for the range of estimated RIP completion times for said each processor, and selecting the selected processor as the processor based on the PDf such that said RIPped sheetside has the highest probability of completing in a minimum RIP completion time.

14. The system of claim 13 further comprising:

a transfer queue switchably coupling the head node to each of the plurality of processors for transferring a raw sheetside to the selected processor wherein the transfer queue has a pre-determined fixed capacity of raw sheetsides.

15. The system of claim 14 wherein the head node is adapted to await available capacity in the transfer queue for a next raw sheetside before selecting a processor for said next raw sheetside, and wherein the head node is adapted to update said PDf for said next raw sheetside for each of the plurality of processors while awaiting available capacity in the transfer queue.

\* \* \* \* \*